United States Patent
Kinugawa et al.

(10) Patent No.: US 11,936,046 B2
(45) Date of Patent: Mar. 19, 2024

(54) ELECTRICITY STORAGE DEVICE, METHOD FOR PRODUCING ELECTRICITY STORAGE DEVICE, AND ELECTROLYTIC PLATING METHOD

(71) Applicant: KABUSHIKI KAISHA TOYOTA JIDOSHOKKI, Kariya (JP)

(72) Inventors: Tatsuya Kinugawa, Kariya (JP); Shota Saga, Kariya (JP); Junji Takeuchi, Kariya (JP); Manabu Osamura, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/769,086

(22) PCT Filed: Oct. 19, 2018

(86) PCT No.: PCT/JP2018/039081
§ 371 (c)(1),
(2) Date: Jun. 2, 2020

(87) PCT Pub. No.: WO2019/111556
PCT Pub. Date: Jun. 13, 2019

(65) Prior Publication Data
US 2021/0234169 A1  Jul. 29, 2021

(30) Foreign Application Priority Data

Dec. 7, 2017 (JP) .................. 2017-235267
Dec. 7, 2017 (JP) .................. 2017-235268
Dec. 7, 2017 (JP) .................. 2017-235274

(51) Int. Cl.
*H01M 4/62* (2006.01)
*C25D 3/12* (2006.01)
(Continued)

(52) U.S. Cl.
CPC ............... *H01M 4/62* (2013.01); *C25D 3/12* (2013.01); *C25D 5/14* (2013.01); *C25D 5/605* (2020.08);
(Continued)

(58) Field of Classification Search
CPC .... H01M 4/62; H01M 50/103; H01M 50/593; H01M 4/667; H01M 10/30;
(Continued)

(56) References Cited

U.S. PATENT DOCUMENTS 4,267,243 A * 5/1981 Park ............... H01M 50/26
429/154
2005/0064291 A1* 3/2005 Sato ............... H01M 4/386
429/233

(Continued)

FOREIGN PATENT DOCUMENTS

JP 06314567 A * 11/1994
JP 2001-279489 A  10/2001
(Continued)

OTHER PUBLICATIONS

Chi-Chang Hu, Chiou-Yi Lin, and Ten-Chin Wen, Textural and electrochemical properties of Watts nickel-deposited titanium electrodes. (1996), Mater. Chem. Phys. 44, p. 234-238 (Year: 1996).*

(Continued)

*Primary Examiner* — Brian R Ohara
*Assistant Examiner* — Emily Elizabeth Freeman
(74) *Attorney, Agent, or Firm* — Sughrue Mion, PLLC

(57) ABSTRACT

An electricity storage device includes a stack of bipolar electrodes each including a steel sheet, and a plating layer provided on a surface of the steel sheet. The plating layer includes a base nickel-plating layer provided on the surface of the steel sheet, and a surface nickel-plating layer provided (Continued)

on the base nickel-plating layer, and having a surface roughness greater than that of the base nickel-plating layer.

15 Claims, 22 Drawing Sheets

(51) Int. Cl.
| | |
|---|---|
| *C25D 5/00* | (2006.01) |
| *C25D 5/14* | (2006.01) |
| *C25D 7/00* | (2006.01) |
| *H01M 4/02* | (2006.01) |
| *H01M 4/66* | (2006.01) |
| *H01M 10/30* | (2006.01) |
| *H01M 50/103* | (2021.01) |
| *H01M 50/593* | (2021.01) |

(52) U.S. Cl.
CPC .............. *C25D 7/00* (2013.01); *H01M 4/667* (2013.01); *H01M 10/30* (2013.01); *H01M 50/103* (2021.01); *H01M 50/593* (2021.01); *H01M 2004/021* (2013.01); *H01M 2004/029* (2013.01)

(58) Field of Classification Search
CPC ...... H01M 2004/021; H01M 2004/029; C25D 5/605; C25D 3/12; C25D 5/14
See application file for complete search history.

(56) References Cited

U.S. PATENT DOCUMENTS

| | | | | |
|---|---|---|---|---|
| 2011/0027650 | A1* | 2/2011 | Yamamoto | ............ H01M 4/387 |
| | | | | 429/218.1 |
| 2013/0273402 | A1* | 10/2013 | Tsutsumi | ................ C25D 9/06 |
| | | | | 429/188 |
| 2019/0088928 | A1* | 3/2019 | Kishi | ................ H01M 10/0585 |

FOREIGN PATENT DOCUMENTS

| | | | |
|---|---|---|---|
| JP | 2001-279490 A | | 10/2001 |
| JP | 2014-56799 A | | 3/2014 |
| KR | 100399778 B1 | * | 12/2003 |

OTHER PUBLICATIONS

Hu et al. (Textural and electrochemical properties of Watts nickel-deposited titanium electrodes. Mater. Chem. Phys. 44, 3 (1996)) (Year: 1996).*
International Search Report dated Jan. 15, 2019 in International Application No. PCT/JP2018/039081.
International Preliminary Report on Patentability dated Jun. 9, 2020 in International Application No. PCT/JP2018/039081.

* cited by examiner

*Fig.2*
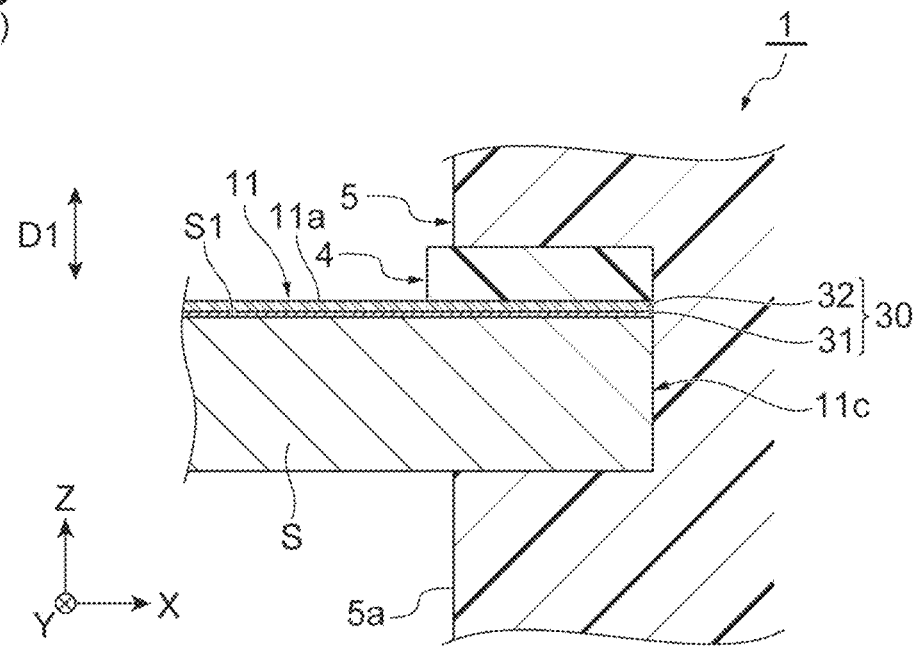
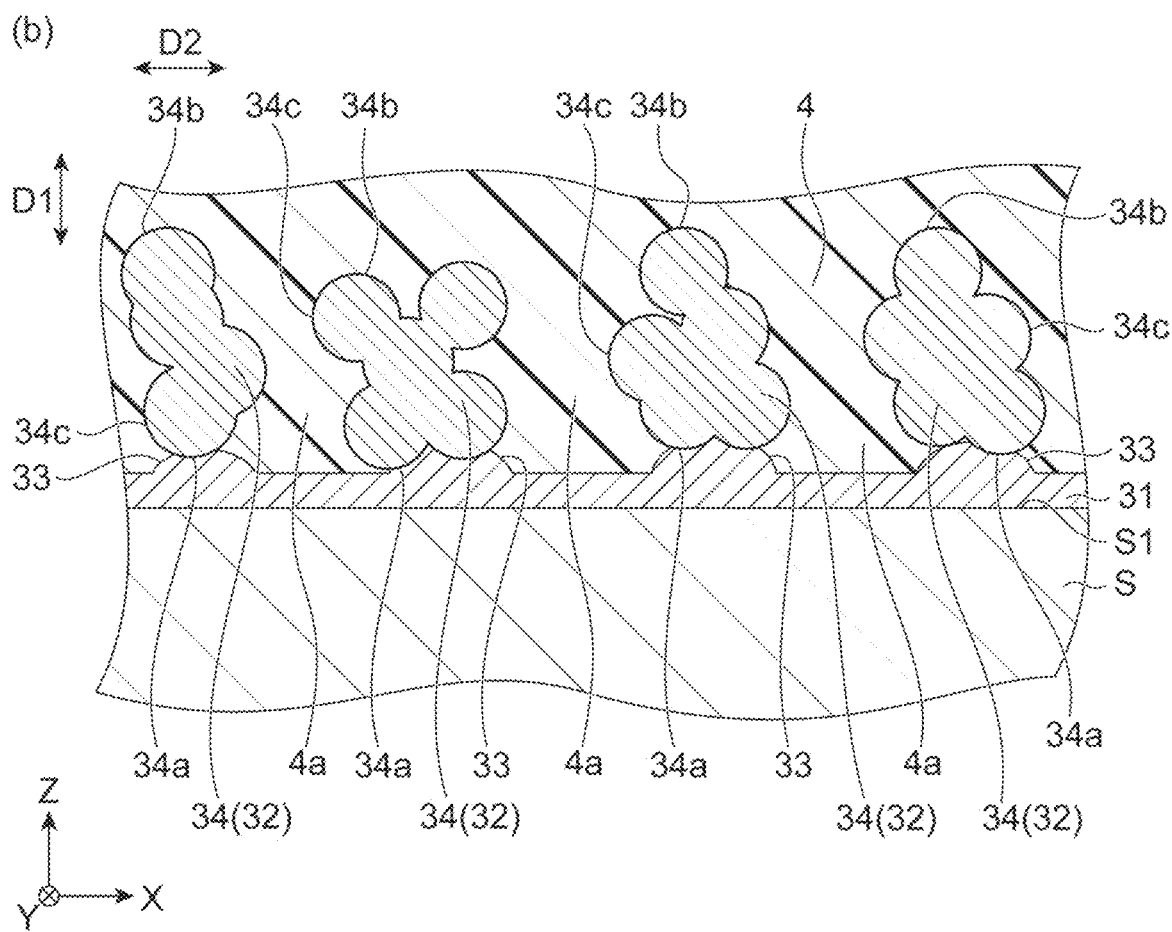

*Fig.3*
(a)
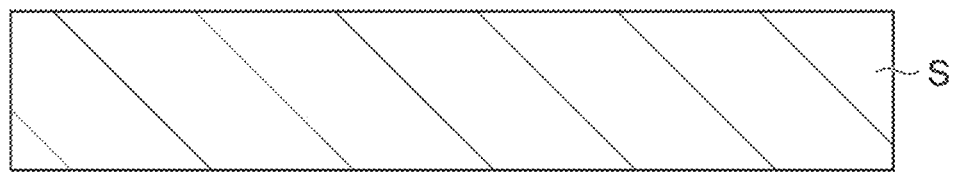
(b)
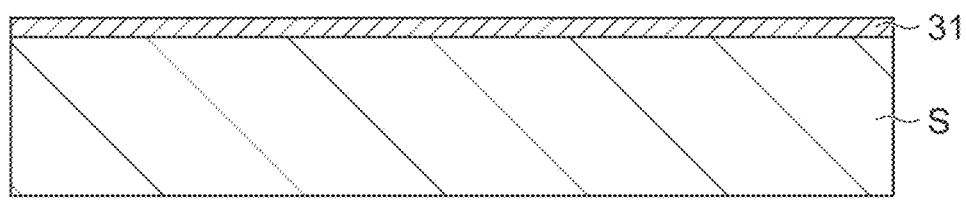
(c)
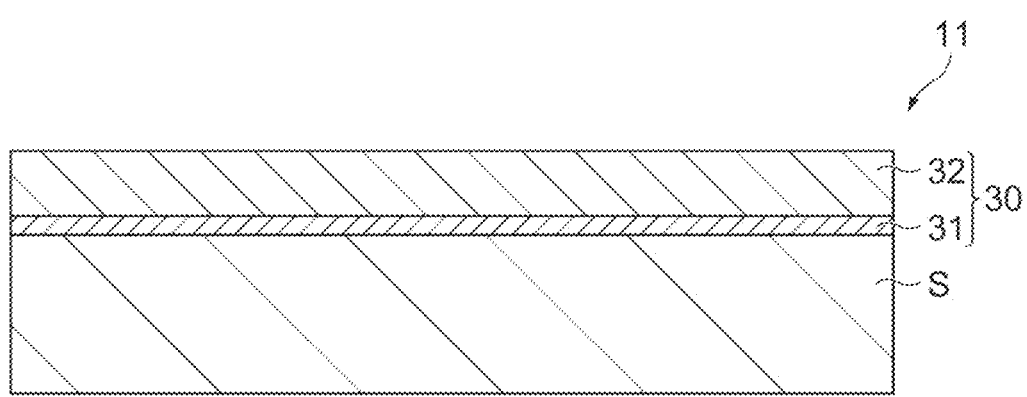

Fig.5
(a)
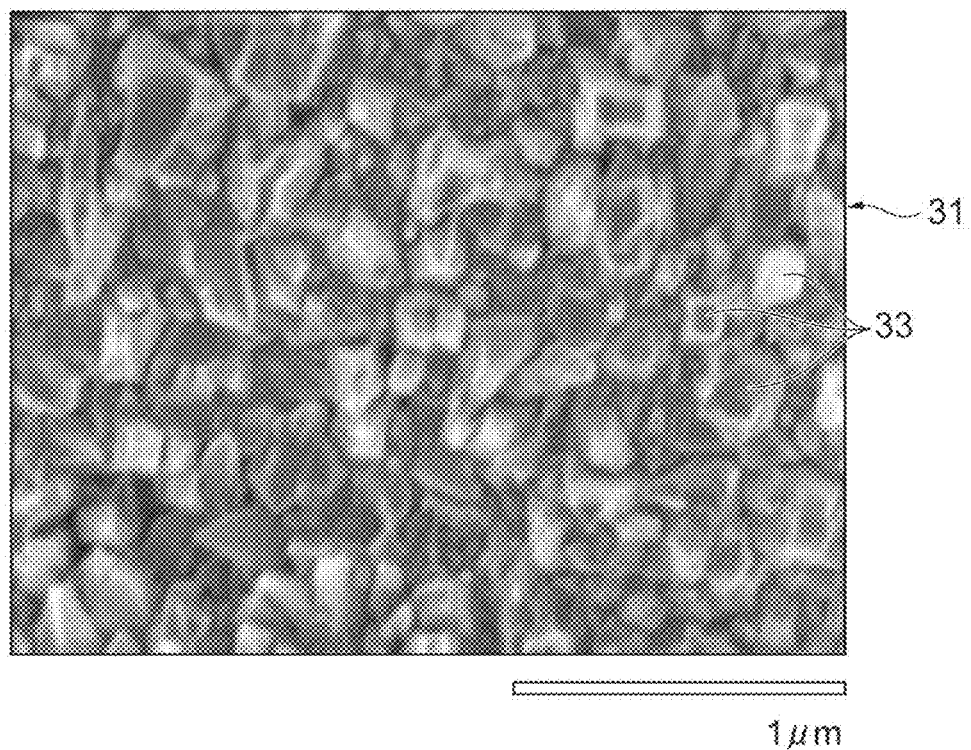
1 μm
(b)
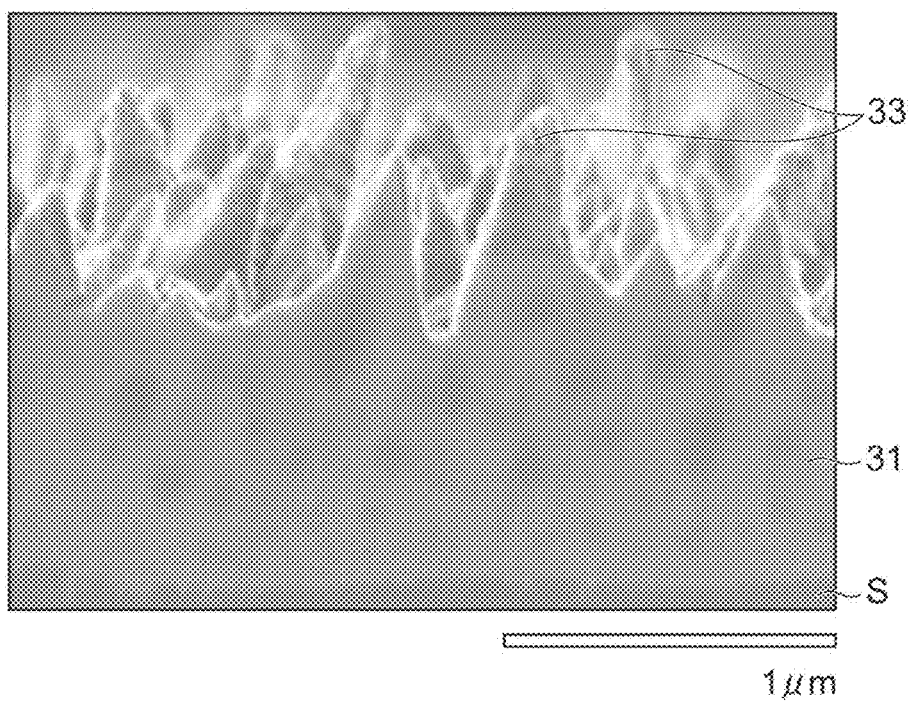
1 μm

Fig.7
(a)
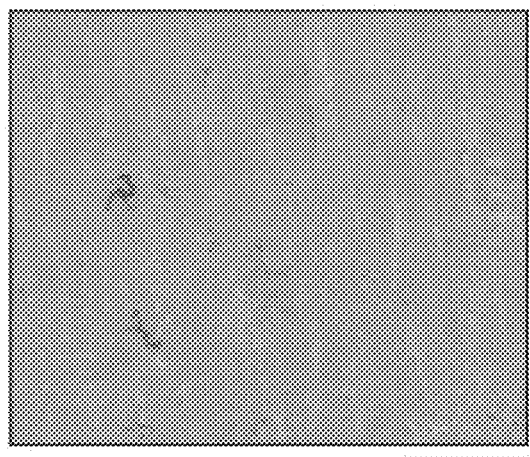
35μm
(b)
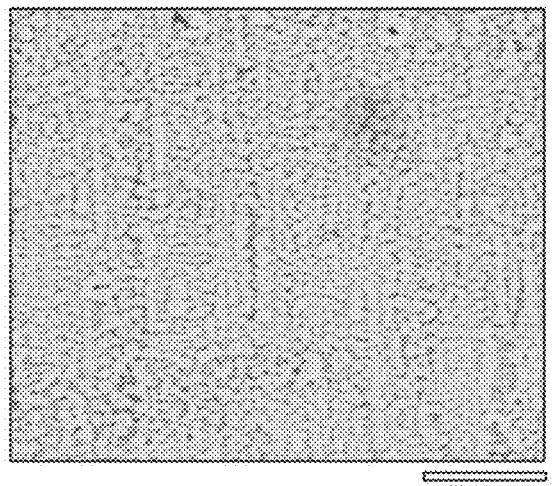
35μm
(c)
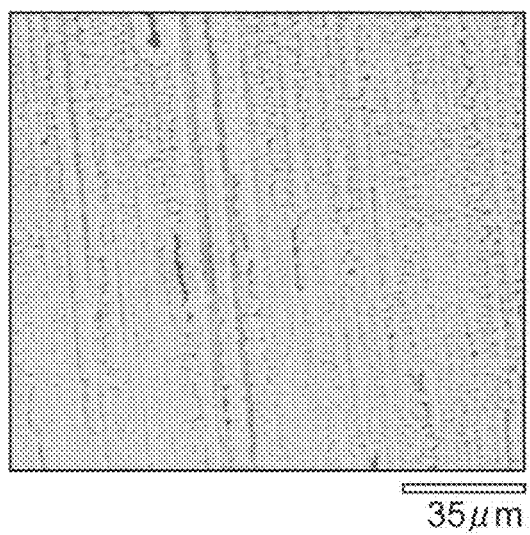
35μm

Fig.11
(a)
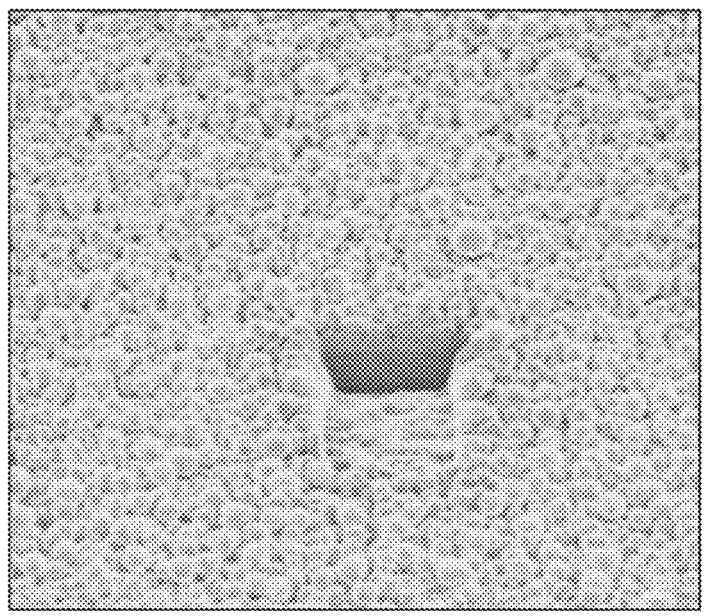
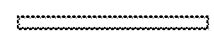
(b)
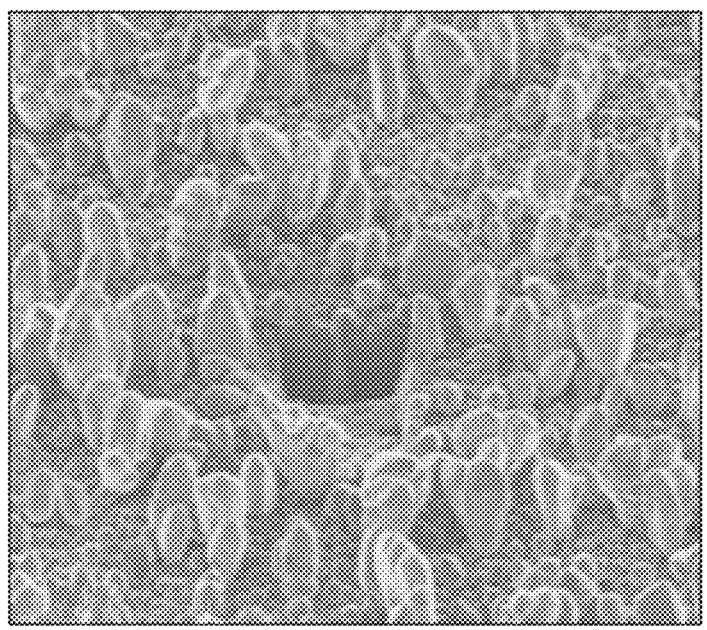
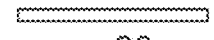

Fig.13
(a)
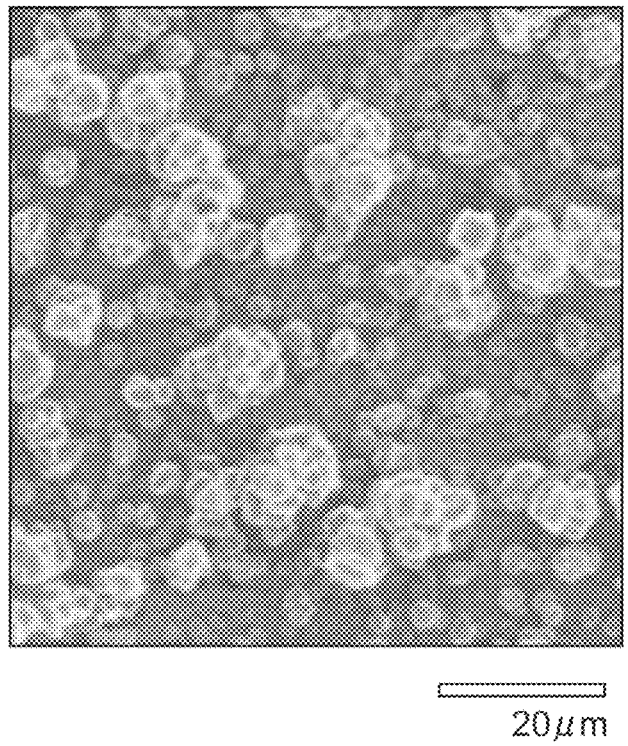
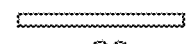
(b)
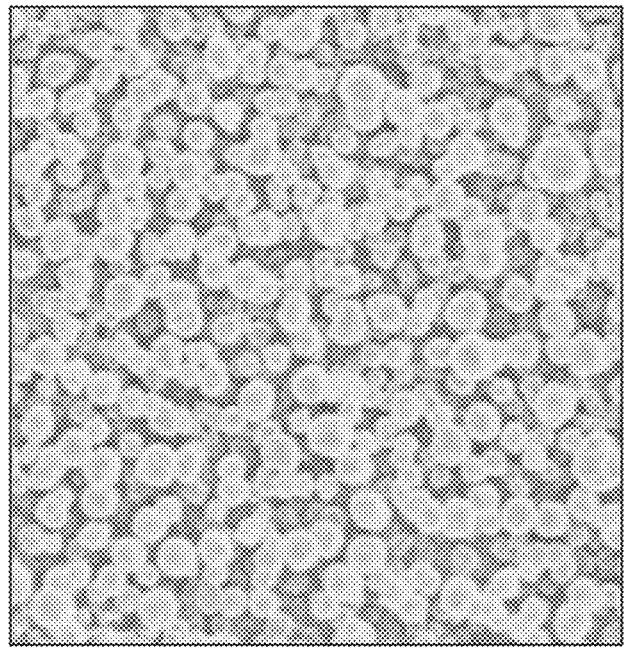
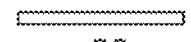

Fig.22 (a)
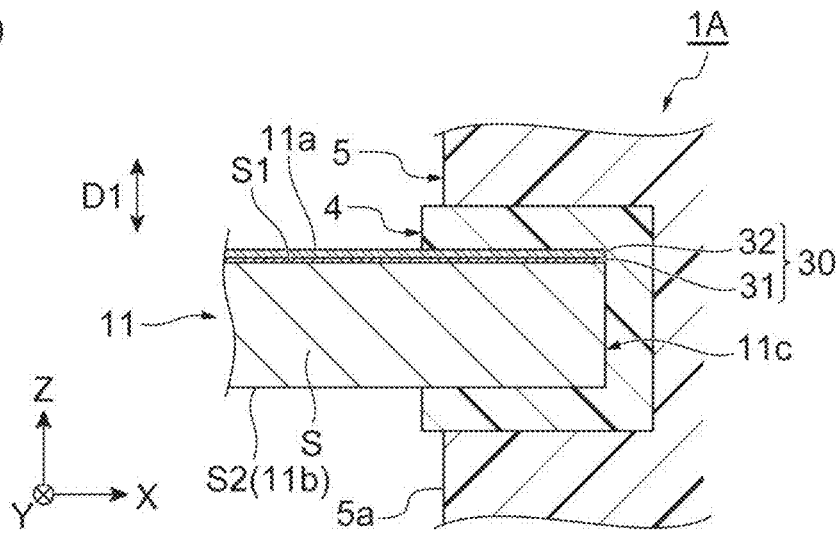
(b)
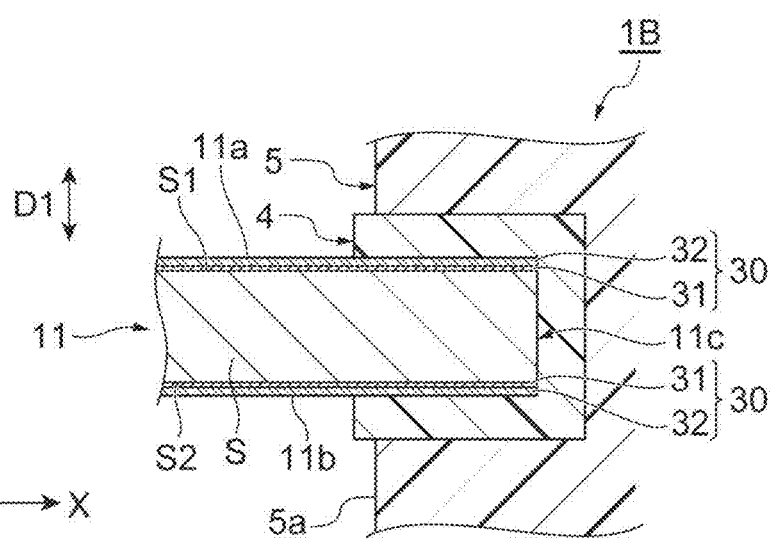
(c)
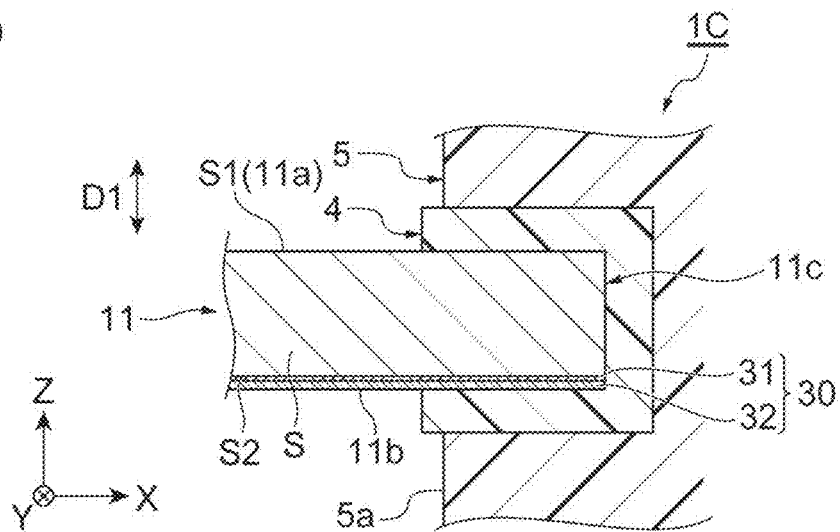

ELECTRICITY STORAGE DEVICE, METHOD FOR PRODUCING ELECTRICITY STORAGE DEVICE, AND ELECTROLYTIC PLATING METHOD

CROSS REFERENCE TO RELATED APPLICATIONS

This application is a National Stage of International Application No. PCT/JP2018/039081 filed Oct. 19, 2018, claiming priority based on Japanese Patent Application No. 2017-235267 filed Dec. 7, 2017, Japanese Patent Application No. 2017-235268 filed Dec. 7, 2017 and Japanese Patent Application No. 2017-235274 filed Dec. 7, 2017.

TECHNICAL FIELD

One aspect of the present invention relates to an electricity storage device, a method for producing an electricity storage device, and an electrolytic plating method.

BACKGROUND ART

Patent Document 1 discloses a bipolar secondary battery. This bipolar secondary battery includes: bipolar electrodes each having a positive electrode provided on one side of a current collector made of a metal, and a negative electrode provided on another side; a separator interposed between the positive electrode and the negative electrode; and a frame-like sealing material surrounding a single cell including the positive electrode, the negative electrode, and the separator, the frame-like sealing material being pressure-bonded between the current collectors. In this bipolar secondary battery, the sealing material is made of a resin, and the sealing material has a high-pressure bonded part surrounding the single cell.

CITATION LIST

Patent Literature

Patent Document 1: Japanese Unexamined Patent Publication No. 2014-56799

SUMMARY OF INVENTION

Technical Problem

In order to achieve a cost reduction in the production of an electricity storage device, an alternative to using a steel sheet applied with nickel plating as a current collector is now being considered. Usually, the surface profile of a plating layer formed by the nickel plating on the surface of the steel sheet follows the surface profile of the steel sheet. In such a case, depending on the surface profile of the steel sheet, a defect such as a pin hole may be formed on the plating layer that is a surface of the current collector. To suppress the occurrence of such defects, there is a demand for reducing the impact of the surface profile of the steel sheet on the electrode performance.

An object of one aspect of the present invention is to provide an electricity storage device, a method for producing an electricity storage device, and an electrolytic plating method capable of reducing the impact of the surface profile of the steel sheet on the electrode performance.

Solution to Problem

An electricity storage device according to one aspect of the present invention includes a stack of electrodes each including a steel sheet, and a plating layer provided on a surface of the steel sheet. The plating layer includes a base nickel-plating layer provided on the surface of the steel sheet, and a surface nickel-plating layer provided on the base nickel-plating layer and having a surface roughness greater than that of the base nickel-plating layer.

In this electricity storage device, the base nickel-plating layer is provided on the surface of the steel sheet, and the surface nickel-plating layer is provided on the base nickel-plating layer. Therefore, the profile of the surface nickel-plating layer disposed on the surface side in the plating layer is less affected by the surface profile of the steel sheet. Consequently, with the electricity storage device, it is possible to reduce the impact of the surface profile of the steel sheet on the electrode performance. In addition, the surface of the surface nickel-plating layer has a surface roughness greater than that of the base nickel-plating layer. With this configuration, because the surface area of the plating layer is increased, it is possible to improve properties such as heat-dissipation performance of the electrode.

The electricity storage device according to one aspect of the present invention may also include a resin spacer disposed along a peripheral portion of the electrode and in contact with the plating layer. The plating layer may have a plurality of protrusions protruding in a direction intersecting with a direction in which the surface of the steel sheet extends. At least some of the protrusions may are shaped so as to become thicker from base ends toward tip ends thereof. A part of the resin spacer may be interposed between adjacent two of the protrusions, at least one of which is shaped so as to become thicker, across a range from the tip ends to the base ends thereof. In such a case, it is possible to restrict the movement of the part of the resin spacer interposed between the two adjacent protrusions in a direction away from the base ends of the protrusions. Therefore, it is possible to reduce the chances of the resin spacer peeling off from the plating layer.

In the electricity storage device according to one aspect of the present invention, the surface nickel-plating layer may have a plurality of protrusions protruding in a direction intersecting with a direction in which the surface of the steel sheet extends, and at least some of the protrusions may shaped so as to become thicker from base ends toward tip ends thereof.

An electricity storage device according to one aspect of the present invention includes a stack of electrodes each including a steel sheet, and a plating layer provided on a surface of the steel sheet. The plating layer includes a base nickel-plating layer provided on the surface of the steel sheet, and a surface nickel-plating layer provided on the base nickel-plating layer and having a plurality of protrusions protruding in a direction intersecting with a direction in which the surface of the steel sheet extends. At least some of the protrusions are shaped so as to become thicker from base ends toward tip ends thereof.

In order to achieve a cost reduction in the production of an electricity storage device, an alternative to using a steel sheet applied with nickel plating as a current collector is now being considered. Usually, the surface profile of a plating layer formed by the nickel plating on the surface of the steel sheet follows the surface profile of the steel sheet. In such a case, the surface area of the plating layer may become insufficient, from the viewpoint of properties such as the heat-dissipation performance of the electrode. Consequently, an object of one aspect of the present invention is to provide an electricity storage device and a method for producing an electricity storage device provided with an electrode including a steel sheet and having a sufficient surface area.

In this electricity storage device, the plating layer includes the surface nickel-plating layer having a plurality of protrusions protruding in a direction intersecting with a direction in which the surface of the steel sheet extends. Therefore, the surface area of the surface nickel-plating layer, which is provided on the surface side, is increased, compared with that of the plating layer simply following the surface profile of the steel sheet. In addition, at least some of the protrusions are shaped so as to become thicker from base ends toward tip ends thereof. The tip end of a protrusion shaped so as to become thicker has a larger area than that of the tip end of an ordinary protrusion shaped so as to become thinner. Therefore, the electricity storage device can be provided with an electrode including a steel sheet and having a sufficient surface area.

The electricity storage device according to one aspect of the present invention may also include a resin spacer disposed along a peripheral portion of the electrode and in contact with the plating layer. A part of the resin spacer may be interposed between adjacent two of the protrusions, at least one of which is shaped so as to become thicker, across a range from the tip ends to the base ends thereof.

In the electricity storage device according to one aspect of the present invention, an average height of the protrusions may be equal to or greater than 15 μm and equal to or smaller than 30 μm. In such a case, it is possible favorably to reduce the chances of the resin spacer peeling off from the plating layer, while suppressing breakage of the protrusions.

In the electricity storage device according to one aspect of the present invention, at least one of the plurality of protrusions may have a plurality of built-up metal deposits. In such a case, irregularities are formed on the surfaces of the protrusions where the metal deposits built-up. Therefore, with the engagement of a part of the resin spacer with the irregular protrusion surface, it is possible favorably to reduce the chances of the resin spacer peeling off from the plating layer.

In the electricity storage device according to one aspect of the present invention, each of the metal deposits may have a spherical shape.

The electricity storage device according to one aspect of the present invention may be a nickel-hydrogen secondary battery, the steel sheet may be made of nickel, and the metal deposits may be nickel.

In the electricity storage device according to one aspect of the present invention, at least one of the plurality of protrusions may have a plurality of built-up nickel crystals. In such a case, irregularities are formed on the surface of the protrusion where the nickel crystals built-up. Therefore, with the engagement of a part of the resin spacer with the irregular protrusion surface, it is possible favorably to reduce the chances of the resin spacer peeling off from the plating layer.

In the electricity storage device according to one aspect of the present invention, the number of protrusions per unit area of the surface nickel-plating layer in a plan view may be equal to or greater than 2,500 and equal to or less than 7,000. In such a case, it is possible to ensure a sufficient surface area of the plating layer, while suppressing the chances of adjacent protrusions being brought into contact with each other.

A method for producing an electricity storage device according to one aspect of the present invention includes: a step of preparing a steel sheet; a step of forming a base nickel-plating layer on a surface of the steel sheet; and a step of forming a surface nickel-plating layer having a surface roughness greater than that of the base nickel-plating layer, on the base nickel-plating layer.

In this method for producing an electricity storage device, the base nickel-plating layer is provided on the surface of the steel sheet, and the surface nickel-plating layer is provided on the base nickel-plating layer. Consequently, the profile of the surface nickel-plating layer is less affected by the surface profile of the steel sheet. Therefore, with the electricity storage device, it is possible to reduce the impact of the surface profile of the steel sheet on the electrode performance. In addition, the surface of the surface nickel-plating layer has a surface roughness greater than that of the base nickel-plating layer. With this configuration, because the surface area of the plating layer is increased, it is possible to improve properties such as heat-dissipation performance of the electrode.

In the method for producing an electricity storage device according to one aspect of the present invention, a base nickel-plating layer having a plurality of convex portions may be formed on the surface of the steel sheet by soaking the steel sheet in a nickel bath in which a nickel concentration is set equal to or higher than 0.5 mol/L and equal to or lower than 2.0 mol/L under a condition in which a current density is equal to or higher than 0.5 A/dm$^2$ and equal to or lower than 5.0 A/dm$^2$. In such a case, it is possible favorably to control the average height and the shapes of the convex portions provided on the base nickel-plating layer. Therefore, the growth of the nickel from the convex portions is promoted, and hence, the surface profile of the steel sheet is affected even less by the profile of the surface nickel-plating layer.

In the method for producing an electricity storage device according to one aspect of the present invention, the steel sheet may be soaked in the nickel bath for a period equal to or more than 150 seconds and equal to or less than 2,400 seconds, under a condition in which a nickel bath temperature is set equal to or higher than 40° C. and equal to or lower than 65° C. In such a case, it is possible to control the average height and the shapes of the convex portions even more favorably.

In the method for producing an electricity storage device according to one aspect of the present invention, the surface nickel-plating layer may include a plurality of protrusions protruding in a direction intersecting with a direction in which the surface of the steel sheet extends, and, in a step of forming the surface nickel-plating layer, at least some of the protrusions may be shaped so as to become thicker from base ends toward tip ends thereof.

A method for producing an electricity storage device according to one aspect of the present invention includes: a step of preparing a steel sheet; a step of forming a base nickel-plating layer on a surface of the steel sheet; and a step of forming a surface nickel-plating layer, having a plurality of protrusions protruding in a direction intersecting with a direction in which the surface of the steel sheet extends, on the base nickel-plating layer. In the step of forming the surface nickel-plating layer, at least some of the protrusions are shaped so as to become thicker from base ends toward tip ends thereof.

In these methods for producing an electricity storage device, the surface nickel-plating layer having a plurality of protrusions is formed on the base nickel-plating layer. Therefore, the surface area of the surface nickel-plating layer, which is provided on the surface side, is increased, compared with that of the plating layer simply following the surface profile of the steel sheet. In addition, at least some of the protrusions are shaped so as to become thicker from the base ends toward the tip ends thereof. The tip end of a protrusion shaped so as to become thicker has a larger area than that of the tip end of an ordinary protrusion shaped so as to become thinner. Consequently, with the producing methods described above, it is possible to produce an electricity storage device that is provided with an electrode including a steel sheet and having a sufficient surface area.

In the method for producing an electricity storage device according to one aspect of the present invention, the surface nickel-plating layer may be formed on the base nickel-plating layer by soaking the steel sheet provided with the base nickel-plating layer in a Watts bath in which the nickel concentration is set equal to or higher than 0.15 mol/L and lower than 0.30 mol/L, under a condition in which the current density is equal to or higher than 30 A/dm$^2$ and equal to or lower than 50 A/dm$^2$. In such a case, because shaping the protrusions so as to become thicker is promoted, the surface area of the surface nickel-plating layer can be increased even more.

In the method for producing an electricity storage device according to one aspect of the present invention, the surface nickel-plating layer may be formed on the base nickel-plating layer by soaking the steel sheet provided with the base nickel-plating layer in a Watts bath in which a temperature is set equal to or higher than 30° C. and equal to or lower than 60° C., for a period equal to or more than 30 seconds and equal to or less than 60 seconds. In such a case, because formation of the protrusions shaped so as to become thicker is promoted even more, the surface area of the surface nickel-plating layer can be increased even further.

In the method for producing an electricity storage device according to one aspect of the present invention, in the step of forming the surface nickel-plating layer, a relative speed of the base nickel-plating layer with respect to the Watts bath may be equal to or lower than 1.0 m/s. In such a case, it is possible to control the number of protrusions per unit area of the surface of the surface nickel-plating layer, favorably.

In the method for producing an electricity storage device according to one aspect of the present invention, in the step of forming the surface nickel-plating layer, at least one of the protrusions may have a plurality of built-up a plurality of nickel crystals. In such a case, because irregularities are formed on the surface of the protrusion where the nickel crystals built-up, the surface area of the protrusions is increased.

In the method for producing an electricity storage device according to one aspect of the present invention, at least one of the step of forming the surface nickel-plating layer and the step of forming the surface nickel-plating layer may include: a first preparing step of preparing a first clamping member that is a conductive member an entire surface of which is applied with insulation coating, and has an opening, and a second clamping member that is a conductive member an entire surface of which is applied with insulation coating; a second preparing step of forming an exposed portion where the conductive member is exposed by removing the insulation coating from a part of one of the first clamping member and the second clamping member; and a plating step of supplying current to the conductive member in one of the first clamping member and the second clamping member, the one being the clamping member having the exposed portion, by clamping the base material with the first clamping member and the second clamping member in such a manner that the opening is placed at a position corresponding to an area to be plated on the base material, and that the exposed portion is placed at a position corresponding to a part to which the current is to be supplied in the base material, and by soaking the base material in plating solution as a cathode.

In this method for producing an electricity storage device, it is possible to form a portion via which the current is to be supplied to the base material by performing a simple task of peeling off a part of the insulation coating from one of the first clamping member and the second clamping member before clamping the base material with the first clamping member and the second clamping member. The clamping member provided with the exposed portion can conduct current to the base material with which the clamping members are brought into contact via the exposed portions. Therefore, the base material can receive the supply of current via the exposed portion by disposing the clamping members in such a manner that the exposed portion is placed at a position corresponding to a part to which the current is to be supplied in the base material before clamping the base material with the first clamping member and the second clamping member. As mentioned earlier, in order to form the portion via which the current is to be supplied, it is only necessary to remove a part of the insulation coating from the clamping member. Therefore, the portion via which the current is to be supplied can be changed in any way. As a result, it is possible to change the portion via which the current is supplied in the base material serving as a cathode in the electrolytic plating.

In the method for producing an electricity storage device according to one aspect of the present invention, in the second preparing step, an exposed portion may be formed on the first clamping member, and, in the plating step, current may be supplied to the first clamping member provided with the exposed portion. In this manner, it is possible to supply current via an area around the area to be plated.

In the method for producing an electricity storage device according to one aspect of the present invention, in the second preparing step, a plurality of exposed portions may be formed on the first clamping member. In this manner, because it is possible to distribute the portions via which the current is supplied across the base material, the base material can be plated more evenly.

In the method for producing an electricity storage device according to one aspect of the present invention, in the second preparing step, an exposed portion may be formed on the second clamping member, and, in the plating step, current may be supplied to the second clamping member that is provided with the exposed portion. In this manner, it is possible to supply current to the base material from the rear side of the area to be plated.

An electrolytic plating method according to one aspect of the present invention includes: a first preparing step of preparing a first clamping member that is a conductive member an entire surface of which is applied with insulation coating, and has an opening, and a second clamping member that is a conductive member an entire surface of which is applied with insulation coating; a second preparing step of forming an exposed portion where the conductive member is exposed by removing the insulation coating from a part of one of the first clamping member and the second clamping member; and a plating step of supplying current to the conductive member in one of the first clamping member and the second clamping member, the one being the clamping member having the exposed portion, by clamping the base material with the first clamping member and the second clamping member in such a manner that the opening is placed at a position corresponding to an area to be plated on the base material, and that the exposed portion is placed at a position corresponding to a part to which the current is to be supplied in the base material, and by soaking the base material in plating solution as a cathode.

In order to achieve a cost reduction in the production of an electricity storage device, an alternative to using steel sheets applied with nickel plating as at least some of the electrode plates is now being considered. When the base material is to be applied with nickel plating, an electrolytic plating method is used, for example. In the electrolytic plating method, the base material to be plated and metal nickel are placed in plating solution that is stored in a plating tank, and direct current is applied, so that the base material serves as a cathode and the metal nickel serves as an anode. With such an electrolytic plating method, because the base material soaked in the plating solution is connected to a power supply above the plating solution, the portion to which the current is supplied (the portion to which the voltage is applied) to the base material is limited to the upper part of the base material. In such a case, the current density becomes uneven across the base material, and as a result the plating thickness becomes uneven. Because the optimal portion to which the current is supplied for achieving an even plating thickness varies depending on the plating conditions, there is a demand for making it possible easily to change the portion to which the current is supplied to the base material. Therefore, an object of one aspect of the present invention is to provide electrolytic plating in which it is possible easily to change the portion to which the current is to be supplied to the base material using the base material as a cathode in the electrolytic plating.

In this electrolytic plating method, it is possible to form a portion via which the current is to be supplied to the base material by performing a simple task of peeling off a part of the insulation coating from one of the first clamping member and the second clamping member before clamping the base material with the first clamping member and the second clamping member. The clamping member provided with the exposed portion can conduct current to the base material with which the clamping member is brought into contact via the exposed portion. Therefore, the base material can receive the supply of current via the exposed portion by disposing the clamping members in such a manner that the exposed portion is placed at a position corresponding to a part to which the current is to be supplied in the base material before clamping the base material with the first clamping member and the second clamping member. As mentioned earlier, in order to form the portion through which the current is to be supplied, it is only necessary to remove a part of the insulation coating from the clamping member. Therefore, the portion through which the current is to be supplied can be changed in any way. As a result, it is possible to change the portion through which the current is to be supplied to the base material used as a cathode in the electrolytic plating.

Advantageous Effects of Invention

According to one aspect of the present invention, it is possible to reduce the impact of the surface profile of the steel sheet on the electrode performance.

BRIEF DESCRIPTION OF DRAWINGS

FIG. 2(a) is an enlarged view of a peripheral portion and a portion around the peripheral portion, in the current collector illustrated in FIG. 1. FIG. 2(b) is an enlarged view of relevant portions of FIG. 2(a).

FIGS. 3(a) to 3(c) are generalized schematics for explaining one example of a method for forming a plating layer on one surface of the current collector.

FIG. 5(a) is a photograph indicating a part of the surface of the base nickel-plating layer. FIG. 5(b) is a photograph indicating a partial cross section of the base nickel-plating layer.

FIG. 7(a) is a photograph indicating a surface of a steel sheet. FIG. 7(b) is a photograph indicating a surface of the current collector having a structure in which only a surface nickel-plating layer is formed on the steel sheet. FIG. 7(c) is a photograph indicating a surface of the current collector having a structure in which a smooth plating layer is formed as the base nickel-plating layer.

FIGS. 11(a) and 11(b) are photographs each indicating a part of a surface of a surface nickel-plating layer.

FIG. 13(a) is a photograph indicating a part of the surface of the surface nickel-plating layer when the rotational frequency of a stir bar was set to 0 $\text{min}^{-1}$. FIG. 13(b) is a photograph indicating a part of the surface of the surface nickel-plating layer when the rotational frequency of the stir bar was set to 800 $\text{min}^{-1}$.

FIGS. 22(a) to 22(c) are enlarged cross-sectional views of the peripheral portions of electrodes according to some modifications.

DESCRIPTION OF EMBODIMENTS

Figure 1:
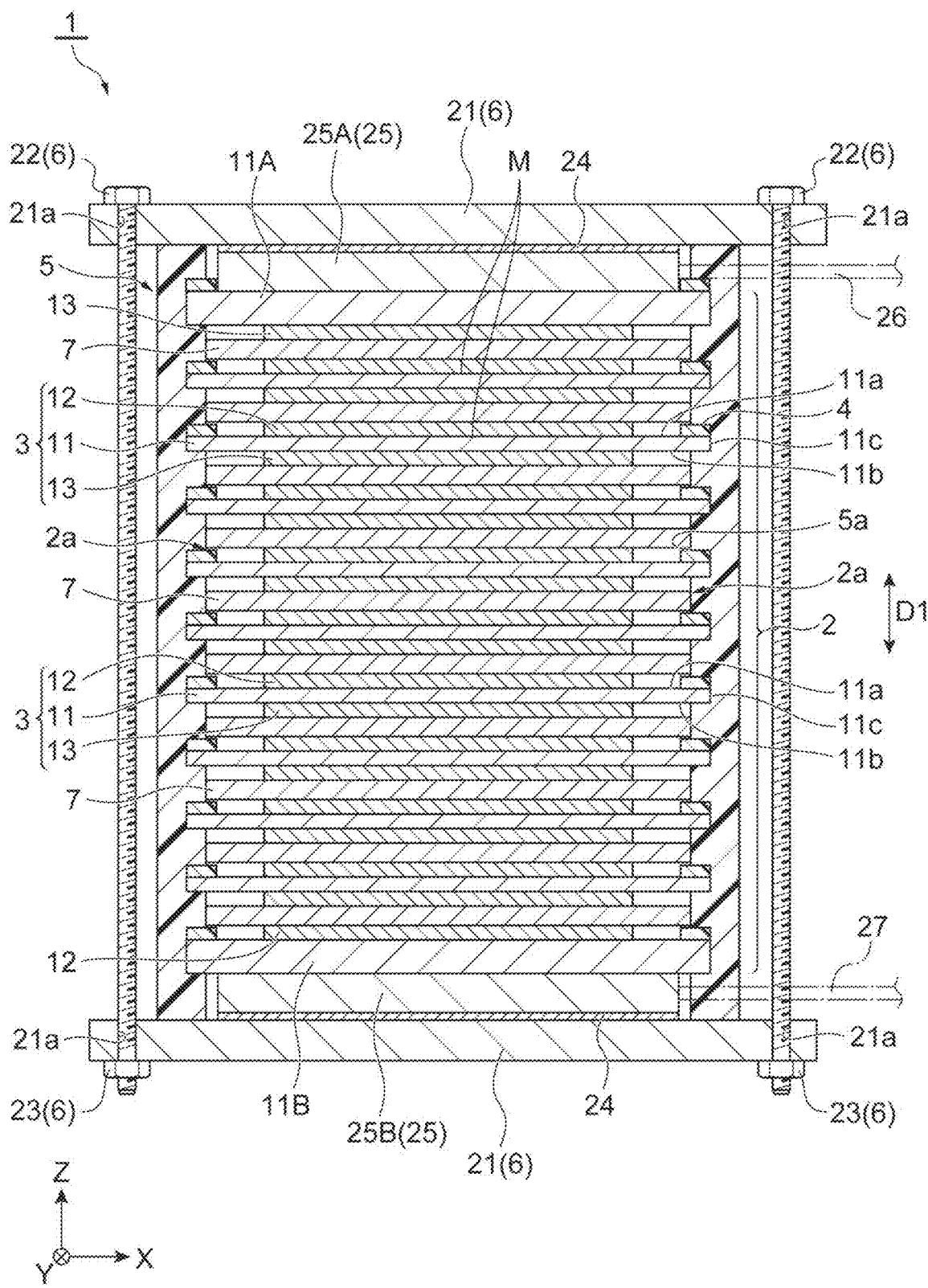
FIG. 1 is a sectional view schematically illustrating an electricity storage device according to a first embodiment.

Some preferred embodiments of an electricity storage device according to one aspect of the present invention will now be explained in detail with reference to some drawings. In the explanation below, elements that are the same, or that have the same functions are assigned with the same reference signs, and redundant explanations will be omitted. In FIGS. 1, 2, and 22, an XYZ Cartesian coordinate system is illustrated, for the convenience of the explanation.

FIG. 1 is a sectional view schematically illustrating an electricity storage device according to one embodiment. This electricity storage device 1 is, for example, a secondary battery such as a nickel-hydrogen secondary battery or a lithium ion secondary battery, or an electric double-layer capacitor. The electricity storage device 1 is used as a battery for various types of vehicles such as a forklift, a hybrid car, or an electric car. Explained below is an example in which the electricity storage device 1 is a nickel-hydrogen secondary battery.

The electricity storage device 1 is a bipolar battery including a stack 2 of bipolar electrodes (electrodes) 3. The electricity storage device 1 includes the stack 2 of the bipolar electrodes 3, a casing 5 for holding the stack 2, and a binding body 6 for binding the stack 2.

The stack 2 is fabricated by stacking a plurality of bipolar electrodes 3 in a first direction D1, with separators 7 interposed between the adjacent bipolar electrodes 3. The first direction D1 herein is a direction extending along the Z-axis direction, and, in the explanation hereunder, is sometimes referred to as an up-and-down direction or a stacking direction. For example, using a bipolar electrode 3 separated from terminal members 25 described later as a reference, other bipolar electrodes 3 are provided on top of and under the bipolar electrode 3, with separators 7 interposed therebetween. Each of the bipolar electrodes 3 includes a current collector 11, a positive electrode layer 12 provided on one surface 11a of the current collector 11, and a negative electrode layer 13 provided on another surface 11b of the current collector 11. The positive electrode layer 12 and the negative electrode layer 13 are both layers made of active materials, and are provided at least to a central portion M of the current collector 11. In the stack 2, the positive electrode layer 12 of a bipolar electrode 3 faces the negative electrode layer 13 of one of two bipolar electrodes 3 adjacent thereto in the first direction D1, and the negative electrode layer 13 of the one bipolar electrode 3 faces the positive electrode layer 12 of the other bipolar electrode adjacent thereto in the first direction D1. The stack 2 includes a plurality of resin spacers 4 for ensuring a clearance between the adjacent bipolar electrodes 3. The resin spacer 4 is disposed along the peripheral portion 11c of the bipolar electrode 3, and provided in contact with one surface of the bipolar electrode 3. The resin spacer 4 is formed by curing resin disposed on the peripheral portion 11c, for example. The uncured resin may be liquid, sheet, or gel.

The current collector 11 is a steel sheet having a surface provided with nickel plating. One example of the steel sheet includes a cold-rolled steel sheet (such as a steel plate cold commercial (SPCC)), as stipulated in JIS G 3141:2005. The thickness of the current collector 11 may be equal to or greater than 0.1 μm and equal to or smaller than 1000 μm, for example. An example of the positive-electrode active material making up the positive electrode layer 12 includes nickel hydroxide. An example of the negative-electrode active material making up the negative electrode layer 13 includes hydrogen storage alloy. The area in which the negative electrode layer 13 is formed on the other surface 11b of the current collector 11 may be somewhat larger than the area in which the positive electrode layer 12 is formed on the one surface 11a of the current collector 11. The nickel plating will be described later in detail.

The peripheral portion 11c of the current collector 11 is a non-coated area where the coating of the positive-electrode active material and the negative-electrode active material is not applied. The peripheral portion 11c is held by the casing 5 in a manner buried in an inner wall 5a of the casing 5. The resin spacer 4 is interposed between the one surface 11a of the peripheral portion 11c and the inner wall 5a. In this manner, between the current collectors 11, 11 that are adjacent in the first direction D1, a space defined by the current collector 11, 11 and the inner wall 5a of the casing 5 is formed. Electrolyte (not illustrated) that is an alkaline solution, such as potassium hydroxide solution, is contained in this space. The spaces in which the electrolyte is contained in between the bipolar electrodes 3 that are adjacent in the adjacent in the first direction D1 are liquid-tightly separated (sealed) from one another by the spacers 4.

A current collector 11A provided only with the negative electrode layer 13 on one side thereof is stacked on one stack end of the stack 2 (in the positive direction in the Z-axis direction). The current collector 11A is disposed in such a manner that the negative electrode layer 13 thereof faces the positive electrode layer 12 of the bipolar electrode 3 in the topmost layer, with the separator 7 interposed therebetween. The current collector 11A may be, for example, a steel sheet applied with nickel plating, in the same manner as the current collector 11, or a metal foil such as nickel foil. A current collector 11B provided only with the positive electrode layer 12 is stacked on the other stack end of the stack 2 (in the negative direction in the Z-axis direction). The current collector 11B is disposed in such a manner that the positive electrode layer 12 thereof faces the negative electrode layer 13 of the bipolar electrode 3 in the bottommost layer, with the separator 7 interposed therebetween. The current collector 11B may be, for example, a steel sheet applied with nickel plating, in the same manner as the current collector 11, or a metal foil such as nickel foil. The end of the current collector 11A, 11B are held by the casing 5 in a manner buried in the inner wall 5a of the casing 5, in the same manner as the current collector 11 of the bipolar electrode 3. The resin spacer 4 is interposed between one surface of the end of the current collector 11A, 11B and the inner wall 5a. The current collectors 11A, 11B may be configured thicker than the current collector 11 included in the bipolar electrode 3.

The separator 7 is an insulator having a sheet-like shape, for example. Examples of the material from which the separator is made include a porous film made of a polyolefin resin such as polyethylene (PE) or polypropylene (PP), and a woven or non-woven fabric made of polypropylene. The separator 7 may be reinforced with, for example, vinylidene fluoride resin compound. The shape of the separator 7 is not limited to a sheet-like shape, but may also be a bag-like shape.

The casing 5 is provided with, for example, a rectangular tube-like shape formed by injection-molding an insulating resin. Examples of the resin material of which the casing 5 is made include polypropylene (PP), polyphenylene sulfide (PPS), modified polyphenylene ether (modified PPE), and modified polyphenylene sulfide (modified PPS). The casing 5 is a member surrounding and holding a side surface 2a of the stack 2 that is a stack of the bipolar electrodes 3.

The binding body 6 includes a pair of binding plates 21, 21, and coupling members (bolts 22 and nuts 23) that couple the binding plates 21, 21 together. The binding plate 21 has a flat plate-like shape made of a metal such as iron. Insertion holes 21a for inserting the bolts 22 are provided at the ends of the binding plate 21, at positions on the outer side of the casing 5. The inner circumferential surface of the insertion hole 21a and the bearing surface of the bolt, which are included in the binding body 6, are insulated. A terminal member 25 (a negative-electrode terminal member 25A, a positive-electrode terminal member 25B) is bonded to one surface of the binding plate 21 with an insulation member 24 interposed therebetween. Examples of the material of the insulation member 24 interposed between the binding plate 21 and the terminal member 25 includes fluororesin and polyethylene resin, for example.

One of the binding plates 21 is positioned on one side of the first direction D1, with respect to the casing 5. The one binding plate 21 is held abutting against one end surface of the casing 5 in such a manner that the negative-electrode terminal member 25A and the current collector 11A are brought into abutment against each other inside of the casing 5. The other binding plate 21 is positioned on the other side of the first direction D1, with respect to the casing 5. The other binding plate 21 is held abutting against the other end surface of the casing 5 in such a manner that the positive-electrode terminal member 25B and the current collector 11B are brought into abutment against each other inside of the casing 5. The bolt 22 is passed through the insertion hole 21a from the side of the one binding plate 21 toward the other binding plate 21, for example, and the nut 23 is screwed onto the tip end of the bolt 22 protruding outside from the other binding plate 21.

In this manner, the stack 2, the current collectors 11A, 11B, and the casing 5 are held between the binding plates 21 and assembled into one unit, and a binding load in the first direction D1 is applied to the stack 2. Furthermore, the negative-electrode terminal member 25A is positioned between the one binding plate 21 and the stack 2, and the positive-electrode terminal member 25B is positioned between the other binding plate 21 and the stack 2. A lead 26 is connected to the negative-electrode terminal member 25A. A lead 27 is connected to the positive-electrode terminal member 25B. The electricity storage device 1 can be charged and discharged through the lead 26 and the lead 27.

A structure of the current collector 11, and a part where the current collector 11, 11A, 11B and the resin spacer 4 are adjoined with each other in the electricity storage device 1 will now be explained with reference to FIGS. 2(a) and 2(b). FIG. 2(a) is an enlarged view of the peripheral portion and a portion around the peripheral portion, in the current collector illustrated in FIG. 1. FIG. 2(b) is an enlarged view of relevant portions of FIG. 2(a). In the explanation below, the current collector 11 will be explained. It is possible for the current collectors 11A, 11B not to have the same structure as the current collector 11.

As illustrated in FIG. 2(a), the peripheral portion 11c of the current collector 11 is provided with a plating layer 30 that covers one surface S1 of the steel sheet S. Therefore, in the peripheral portion 11c of the current collector 11, the resin spacer 4 is provided in contact with the plating layer 30. The plating layer 30 is provided to ensure the strength and the liquid tightness between the steel sheet S and the resin spacer 4, and to increase the surface area of the current collector 11. The plating layer 30 may be formed on the surface of the steel sheet S, by applying nickel electrolytic plating to the steel sheet S making up the current collector 11. Therefore, the plating layer 30 corresponds to a nickel layer formed by electrolytic plating. The thickness of the plating layer 30 is set equal to or greater than 5 μm and equal to or smaller than 20 μm, for example.

As illustrated in FIGS. 2(a) and 2(b), the plating layer 30 includes a base nickel-plating layer 31 provided on the one surface S1 of the steel sheet S, and a surface nickel-plating layer 32 provided on the base nickel-plating layer 31. The base nickel-plating layer 31 and the surface nickel-plating layer 32 are formed by performing electrolytic plating using conditions that are different from each other.

The base nickel-plating layer 31 is an electrolytic plating layer provided on the one surface S1 of the steel sheet S along a second direction D2 intersecting with the first direction D1. The second direction D2 corresponds to a direction following the XY plane, or a direction in which the one surface S1 extends. Therefore, the second direction D2 does not necessarily need to be perpendicular to the first direction D1. The thickness of the base nickel-plating layer 31 is equal to or greater than 0.5 μm and equal to or smaller than 2 μm, for example. It is preferable for the base nickel-plating layer 31 to cover the entire one surface S1 in the peripheral portion 11c. In such a case, because the chances of pin holes or the like being formed on the plating layer 30 is reduced, it is possible to suppress generation of leakage current. The surface profile of the base nickel-plating layer 31 is different from that of the one surface S1. Specifically, the base nickel-plating layer 31 has a plurality of convex portions 33 protruding in the first direction D1. Therefore, the surface profile of the base nickel-plating layer 31 does not follow the one surface S1 of the steel sheet S, and is rougher than the surface profile of the one surface S1 of the steel sheet S. Therefore, the base nickel-plating layer 31 is provided differently from a smooth plating layer. The smooth plating layer is a plating layer having a surface profile following the surface to be plated.

The convex portions 33 are provided irregularly along the second direction D2. When the thickness of the base nickel-plating layer 31 is 1 μm or more, the average height of the convex portions 33 may be equal to or greater than 0.4 μm, and equal to or less than a half of the thickness of the base nickel-plating layer 31, for example. In such a case, it is possible to achieve a favorable profile of the surface nickel-plating layer 32. The average height of the convex portions 33 is measured using a microscope that uses a laser confocal optical system, for example.

The surface nickel-plating layer 32 is an electrolytic plating layer formed on the base nickel-plating layer 31, as a film-forming surface, and has a surface roughness that is greater than that of the base nickel-plating layer 31. The surface roughness of the base nickel-plating layer 31 and that of the surface nickel-plating layer 32 are represented in arithmetic average roughness Ra as stipulated in JIS B 0601:2013 (or ISO 4287:1997, Amd.1:2009). The surface roughness of the surface nickel-plating layer 32 is equal to or greater than 1.5 μm and equal to or smaller than 6.0 μm, for example, and is equal to or more than 1.5 times and equal to or less than 60.0 times that of the base nickel-plating layer 31. In such a case, it is possible to increase the surface area of the surface nickel-plating layer 32, while suppressing formation of pin holes or the like on the plating layer 30. The thickness of the surface nickel-plating layer 32 is equal to or greater than 5 μm and equal to or smaller than 20 μm, for example. In the peripheral portion 11c of the current collector 11, the surface nickel-plating layer 32 does not necessarily need to be formed in a manner covering the entire surface of the base nickel-plating layer 31. For example, the surface nickel-plating layer 32 may be aggregation of a plurality of protrusions 34 protruding from the base nickel-plating layer 31 in the first direction D1. In such a case, the surface nickel-plating layer 32 is also referred to as a roughening plating layer. Each of the protrusions 34 is formed in a manner extending from a base end 34a that is a portion that is in contact with corresponding one of the convex portions 33, and reaching a tip end 34b, in the first direction D1.

At least one of the protrusions 34 has a plurality of built-up a plurality of nickel crystals each forming a substantially spherical shape, for example, and forms a plurality of protrusions. These nickel crystals are a plurality of metal deposits (applied material) formed by electrolytic plating. Such metal deposits overlapping one another form an enlarged portion 34c that is where a length size of the protrusion 34 in the second direction D2 is larger than that of the base end 34a in the second direction D2. In other words, at least some of the protrusions 34 are shaped so as to become thicker from the base ends 34a toward the tip ends 34b thereof. The position where the enlarged portion 34c is provided in the protrusion 34 does not necessarily need to be the tip end 34b, but is at least positioned on the side nearer the tip end 34b, rather than the base end 34a. In other words, in the protrusion 34 is shaped so as to become thicker, the portion having the greatest length size in the second direction D2 does not need to be the tip end 34b, but is provided at positions other than the base end 34a. The position where the enlarged portion 34c is provided at the protrusion 34 may be different among the protrusions 34, depending on how the metal deposits overlap one another.

A part 4a of the resin spacer 4 is interposed between adjacent two of the protrusions 34, at least one of the two is shaped so as to become thicker. For example, before the resin making up the resin spacer 4 becomes cured, a part of the resin is placed between the protrusions 34. By then curing the entire resin, a part 4a of the resin spacer 4 becomes interposed between the protrusions 34. In this manner, the two adjacent protrusions 34 restrict the movement of the part 4a of the resin spacer 4 interposed therebetween, in a direction away from the base end 34a. In other words, the cross-sectional shape between the adjacent protrusions 34 has an undercut shape that achieves the anchoring effect.

The average height of the protrusions 34 is equal to or greater than 15 μm and equal to or smaller than 30 μm, for example. By setting the average height of the protrusions 34 equal to or greater than 15 μm, the anchoring effect given to the part 4a of the resin spacer 4 interposed between the two adjacent protrusions 34 is exerted favorably. By setting the average height of the protrusions 34 equal to or smaller than 30 μm, it is possible to suppress breakage of the protrusions 34 favorably. The average height of the protrusions 34 is measured using a microscope that uses a laser confocal optical system, for example.

In a plan view (that is, in a view along the first direction D1), the number of protrusions 34 per unit area of the surface nickel-plating layer 32 is equal to or greater than 2,500 and equal to or less than 7,000, for example. By setting the number of protrusions 34 equal to or greater than 2,500, it is possible to ensure a sufficient surface area of the surface nickel-plating layer 32. By setting the number of protrusions 34 equal to or less than 7,000, it is possible to reduce the chances of adjacent protrusions 34 being brought into contact with each other. In one embodiment, the unit area is 1 $mm^2$. The number of protrusions 34 per unit area of the surface nickel-plating layer 32 is calculated as a mean width of the roughness profile element RSm, as stipulated in JIS B 0601:2013 (or ISO 4287:1997, Amd.1:2009), for example.

The plating layer 30 covering the one surface S1 of the steel sheet S is formed in the central portion M of the bipolar electrode 3 (see FIG. 1). The central portion M is bonded to the positive-electrode active material of the positive electrode layer 12 via the plating layer 30. In other words, in one embodiment, the plating layer 30 is formed continuously from the peripheral portion 11c to the central portion M, on the one surface S1 of the steel sheet S. More specifically, the base nickel-plating layer 31 covers the entire one surface S1 of the steel sheet S. The surface nickel-plating layer 32, however, does not need to cover the entire surface of the base nickel-plating layer 31.

In each one of the steel sheets S, the plating layer 30 covers one of the surfaces in the first direction D1 (the surface in the positive direction in the Z-axis direction). In all of the current collectors 11, the resin spacer 4 is disposed via the plating layer 30. In this manner, in the bipolar electrodes 3 that are adjacent to each other in the first direction D1, the resin spacer 4 positioned on the one surface 11a of the current collector 11 faces the other surface 11b of the current collector 11 in the first direction D1. In other words, in the adjacent bipolar electrodes 3, the one surface 11a of the current collector 11 and the other surface 11b of the current collector 11 are separated from each other by the resin spacer 4 that is a resin member. Therefore, in the adjacent bipolar electrodes 3, the resin spacer 4 ensures the insulation between the one surface 11a of the current collector 11 and the other surface 11b of the current collector 11.

One example of a method for forming the plating layer 30 will now be explained with reference to FIGS. 3(a) to 3(c). FIGS. 3(a) to 3(c) are generalized schematics for explaining one example of a method for forming a plating layer on one surface of the current collector. In each of FIGS. 3(b) and 3(c), specific surface profiles of the base nickel-plating layer 31 and the surface nickel-plating layer 32 are omitted.

To begin with, as illustrated in FIG. 3(a), a steel sheet S making up the current collector 11 is prepared. The base nickel-plating layer 31 having a surface profile that is different from the surface profile of the steel sheet S is then formed on the surface S1 of the steel sheet S that is the current collector 11, as illustrated in FIG. 3(b). The base nickel-plating layer 31 is formed by electrolytic plating the steel sheet S. Used in the electrolytic plating is a nickel bath in which the nickel concentration is set equal to or higher than 0.5 mol/L and equal to or lower than 2.0 mol/L, and the temperature is set equal to or higher than 40° C. and equal to or lower than 65° C., for example. The nickel bath is electrolyte containing nickel cations, and examples of the nickel bath include nickel chloride solution and nickel sulfate solution. By setting the nickel concentration of the nickel bath equal to or higher than 0.5 mol/L and equal to or lower than 2.0 mol/L, it is possible to form the plating layer efficiently. By setting the temperature of the nickel bath equal to or higher than 40° C. and equal to or lower than 65° C., it is possible to control the average height of the convex portions 33 provided on the base nickel-plating layer 31 favorably.

When the electrolytic plating for forming the base nickel-plating layer 31 is to be performed, the steel sheet S is soaked in the nickel bath for a period equal to or more than 150 seconds and equal to or less than 2,400 seconds, under a condition in which the current density is set equal to or higher than 0.5 A/dm² and equal to or lower than 5.0 A/dm², for example. By setting the current density during the electrolytic plating equal to or higher than 0.5 A/dm² and equal to or lower than 5.0 A/dm², it is possible to prevent the base nickel-plating layer 31 from becoming a smooth plating layer. In addition, it is also possible to reduce the chances of the convex portions 33 formed on the base nickel-plating layer 31 having a needle-like shape (whisker-like shape). Furthermore, by soaking the steel sheet S in the nickel bath for a period equal to or more than 150 seconds and equal to or less than 2,400 seconds, it is possible to set the thickness of the base nickel-plating layer 31 favorably.

The conditions of particular significance when the base nickel-plating layer 31 is formed are the temperature and the current density of the nickel bath. Therefore, when the temperature and the current density of the nickel bath are both within the ranges mentioned above, the nickel concentration of the nickel bath and the time for which the steel sheet S is soaked do not necessarily need to be within the ranges mentioned above.

Figure 4:
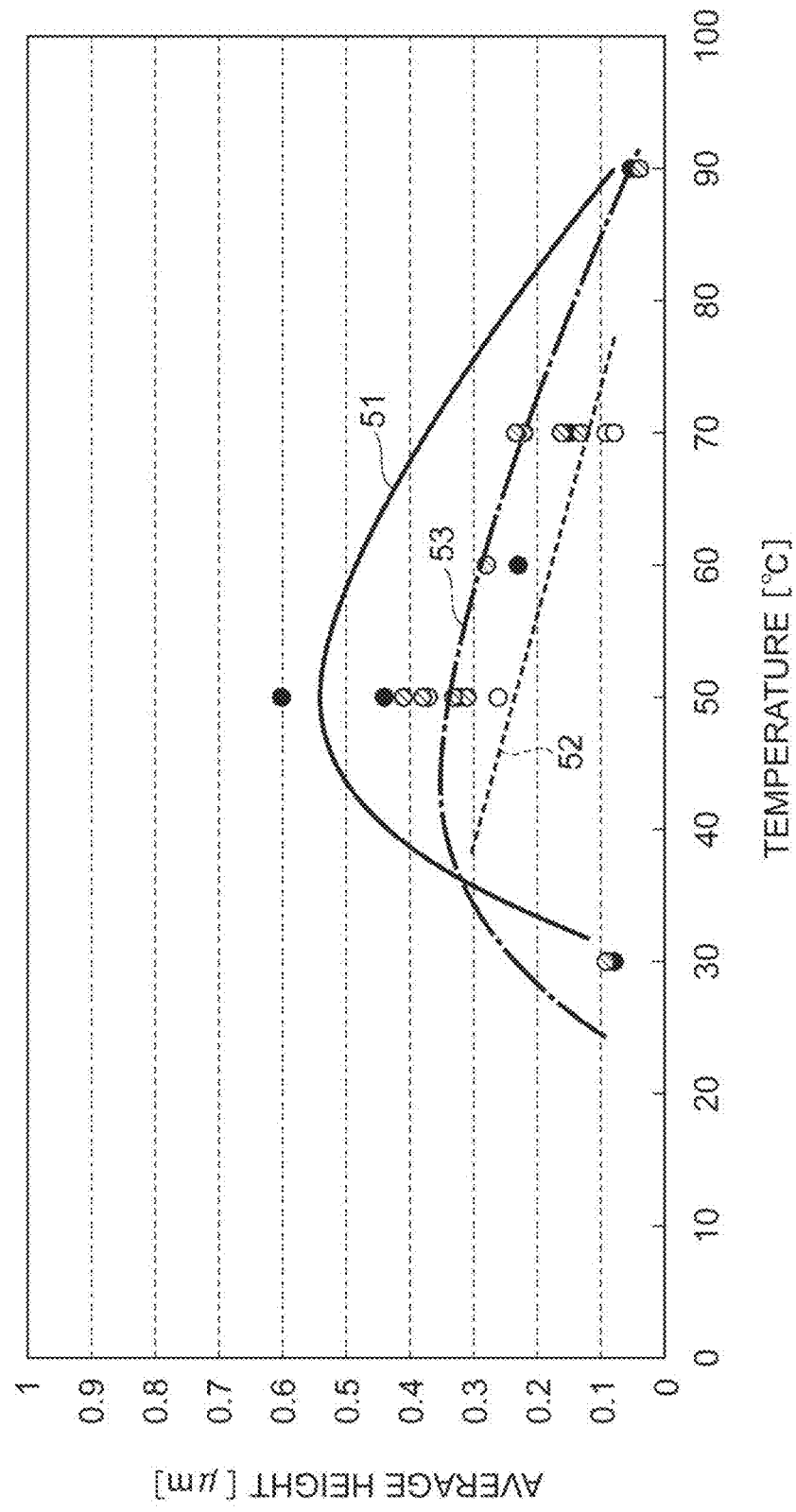
FIG. 4 is a graph illustrating a change in the average height of convex portions of a base nickel-plating layer, with respect to a nickel bath temperature.

FIG. 4 is a graph illustrating a change in the average height of convex portions of a base nickel-plating layer, with respect to a nickel bath temperature. In FIG. 4, the vertical axis represents the average height of the convex portions, and the horizontal axis represents the temperature of the nickel bath. The solid line 51 represents a change in the average height of the convex portions with respect to the temperature of the nickel bath when the current density is set 1.0 A/dm². The dotted line 52 represents a change in the average height of the convex portions with respect to the temperature of the nickel bath when the current density is set 0.5 A/dm². The long dashed short dashed line 53 represents a change in the average height of the convex portions with respect to the temperature of the nickel bath when the current density is set 5 A/dm². When the current density is set 1.0 A/dm², for example, if the temperature of the nickel bath is equal to or higher than 40° C. and equal to or lower than 65° C., the average height of the convex portions will be equal to or greater than 0.4 μm. When the temperature of the nickel bath is 50° C., the average height of the convex portions is the greatest. By contrast, when the current density is too low, and when the current density is too high, the average height of the convex portions tend to be less than 0.4 μm, regardless of the temperature of the nickel bath.

The surface profile of an actually formed base nickel-plating layer on a steel sheet is illustrated in FIGS. 5(a) and 5(b). FIG. 5(a) is a photograph indicating a part of the surface of the base nickel-plating layer, and FIG. 5(b) is a photograph indicating a partial cross section of the base nickel-plating layer. The base nickel-plating layer 31 illustrated in FIGS. 5(a) and 5(b) was formed by soaking the steel sheet S in a nickel chloride bath having a temperature of 50° C. and a nickel concentration of 1 mol/L, for 300 seconds, under a condition in which the current density was set to 1 A/dm². As illustrated in FIG. 5(a), a large number of convex portions 33 are provided on the surface of the base nickel-plating layer 31. Furthermore, as illustrated in FIG. 5(b), the surface profile of the base nickel-plating layer 31 is significantly different from that of the steel sheet S. Such a base nickel-plating layer 31 is provided with a large number of the convex portions 33, and has a surface profile that is significantly different from that of the steel sheet S. Furthermore, the roughness Ra of the surface of the base nickel-plating layer 31 was equal to or greater than 0.1 μm and equal to or smaller than 1.0 μm, for example.

The surface nickel-plating layer 32 (see FIG. 2(b)) including the protrusions 34 and having a greater surface roughness than that of the base nickel-plating layer 31 is then formed on the base nickel-plating layer 31, as illustrated in FIG. 3(c). In this manner, a current collector 11 including the steel sheet S and the plating layer 30 that includes the base nickel-plating layer 31, and the surface nickel-plating layer 32 is obtained. The surface nickel-plating layer 32 is formed by electrolytic plating the steel sheet S on which the base nickel-plating layer 31 is formed. Used in this electrolytic plating is a Watts bath in which the nickel concentration is set equal to or higher than 0.15 mol/L and lower than 0.30 mol/L, and the temperature is set equal to or higher than 30° C. and equal to or lower than 60° C., for example. The Watts bath is electrolyte the main components of which are nickel sulfate, nickel chloride, and boric acid. By setting the nickel concentration of the Watts bath equal to or higher than 0.15 mol/L and lower than 0.30 mol/L, it is possible to form the protrusions 34 are shaped so as to become thicker, favorably. Furthermore, by setting temperature of the Watts bath equal to or higher than 30° C. and equal to or lower than 60° C., it is possible to control the average height of the protrusions 34 are shaped so as to become thicker, favorably.

When the electrolytic plating for forming the surface nickel-plating layer 32 is to be performed, the steel sheet S is soaked in the nickel bath for a period equal to or more than 30 seconds and equal to or less than 60 seconds, under a condition in which the current density is set equal to or higher than 30 A/dm² and equal to or lower than 50 A/dm², for example. By setting the current density during the time of electrolytic plating equal to or higher than 30 A/dm² and 50 A/dm², it is possible to form the protrusions 34 are shaped so as to become thicker, favorably. Furthermore, by soaking the steel sheet S in the Watts bath for a period equal to or more than 30 seconds and equal to or less than 60 seconds, it is possible to set the thickness of the surface nickel-plating layer 32, favorably.

The conditions of particular significance when the surface nickel-plating layer 32 is formed are the nickel concentration and the current density of the Watts bath. Therefore, when the nickel concentration and the current density of the Watts bath are both within the ranges mentioned above, the temperature of the Watts bath and the time for which the steel sheet S is soaked do not necessarily need to be within the ranges mentioned above.

Figure 6:
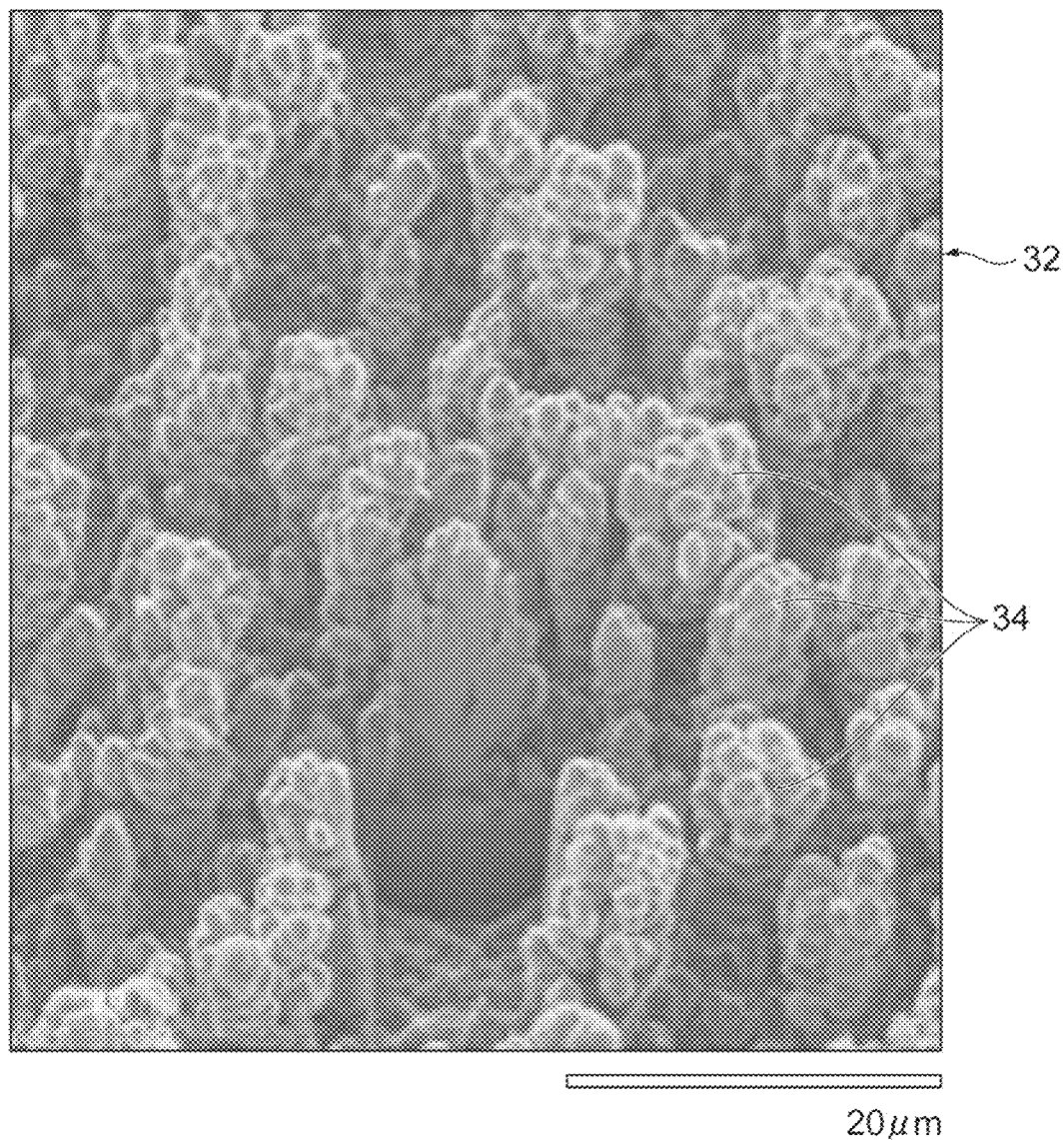
FIG. 6 is a photograph indicating a part of the surface of a surface nickel-plating layer.

The nickel surface profile of an actually formed surface nickel-plating layer is indicated in FIG. 6. FIG. 6 is a photograph indicating a part of the surface of the surface nickel-plating layer. The surface nickel-plating layer 32 indicated in FIG. 6 was formed by soaking the steel sheet having the base nickel-plating layer formed thereon in a Watts bath in which the temperature was set to 30° C., and the nickel concentration was set to 0.2 mol/L, for 40 seconds, under a condition in which the current density was set to 40 A/dm². As indicated in FIG. 6, the protrusion 34 are shaped so as to become thicker from a base end toward a tip end thereof were found in plurality. Furthermore, a plurality of nickel crystals were overlapping on the surface of these protrusions 34. Therefore, the surface roughness of the surface nickel-plating layer 32 having these protrusions 34 was clearly greater than that of the base nickel-plating layer 31. The surface roughness of the surface nickel-plating layer 32 was clearly greater than that of the base nickel-plating layer 31, and the surface roughness Ra was, for example, equal to or greater than 1.5 μm and equal to or smaller than 6.0 μm.

The bipolar electrode 3 can be formed by providing an active material layer, as appropriate, to the current collector 11 that has the plating layer 30 formed by the forming method described above. By then stacking a plurality of the bipolar electrodes 3 and the separators 7 as appropriate, it is possible to form the stack 2. The electricity storage device 1 illustrated in FIG. 1 can be then produced using the stack 2. As a method for producing the electricity storage device 1 using the bipolar electrodes 3, a publicly known method may be used, as appropriate.

Figure 8:
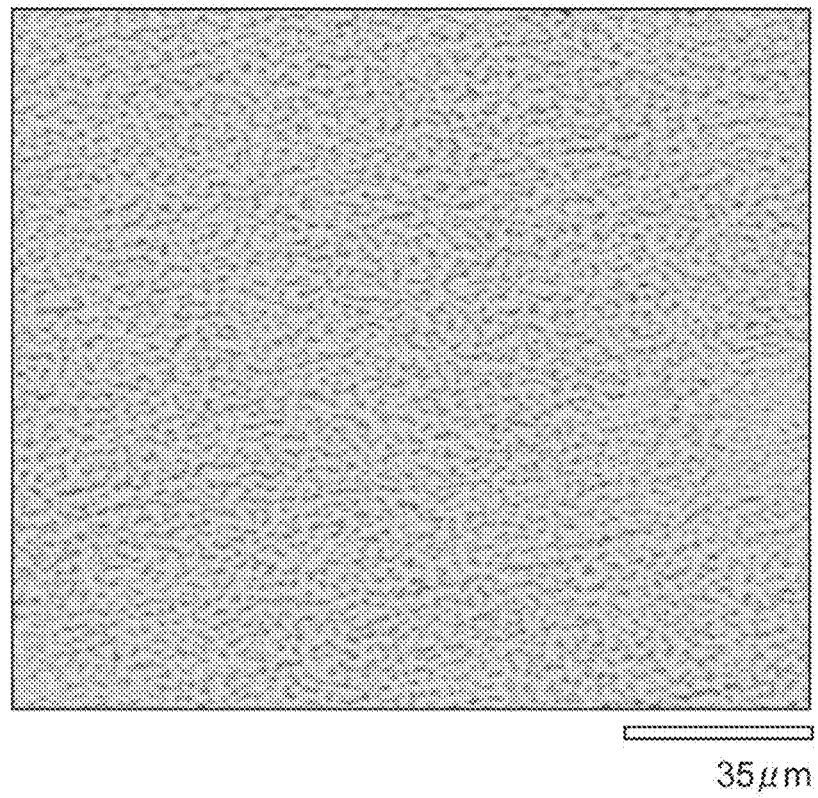
FIG. 8 is a photograph indicating a surface of a current collector having a structure in which the base nickel-plating layer has a surface profile different from that of the steel sheet.

Actions and effects achieved by the electricity storage device 1 according to the one embodiment will now be explained with reference to FIGS. 7(a) to 7(c), and 8. FIG. 7(a) is a photograph indicating a surface of a steel sheet. FIG. 7(b) is a photograph indicating a surface of the current collector having a structure in which only the surface nickel-plating layer is formed on the steel sheet. FIG. 7(c) is a photograph indicating a surface of the current collector having a structure in which a smooth plating layer is formed as the base nickel-plating layer. FIG. 8 is a photograph indicating a surface of a current collector having a structure in which the base nickel-plating layer has a surface profile different from that of the steel sheet.

As illustrated in FIG. 7(a), the surface of the steel sheet has some scratches formed in the production process. Therefore, the surface of the steel sheet has some irregularities. There is a tendency for the surface of the steel sheet not to be completely plated, without any base nickel-plating layer formed thereon, as illustrated in FIG. 7(b). In other words, many pin holes and the like are formed on the plating layer. In such a case, the leakage current in the current collector becomes increased, and the performance of the electrode including the current collector deteriorate prominently. Furthermore, when a smooth plating layer is formed, as the base nickel-plating layer, on the surface of the steel sheet, less pin holes and the like are formed on the plating layer. The performance of the electrode including the current collector provided with such a base nickel-plating layer tends to be better than that of the electrode including the current collector without the base nickel-plating layer. However, there is a tendency for the surface of the surface nickel-plating layer to have extensive irregularities remaining thereon, as illustrated in FIG. 7(c). In the area having such irregularities, there is a tendency for the sealability achieved with the resin spacer to fall short, increasing the chances of the leakage current being conducted. Therefore, even when a smooth plating layer is formed as the base nickel-plating layer on the surface of the steel sheet, there is still some possibility that the electrode performance deteriorates. By contrast, when the surface profile of the base nickel-plating layer is made different from that of the steel sheet, the surface of the current collector is completely covered with the plating layer, as illustrated in FIG. 8, and has no prominent irregularity. The performance of the electrode including such a current collector is less affected by the surface profile of the steel sheet.

As described above, in the electricity storage device 1 produced with the producing method according to one embodiment, the base nickel-plating layer 31 is provided on the surface of the steel sheet S, and the surface nickel-plating layer 32 is provided on the base nickel-plating layer 31. Therefore, the profile of the surface nickel-plating layer 32 positioned on the surface side in the plating layer 30 is less affected by the surface profile of the steel sheet S. Consequently, with the electricity storage device 1, it is possible to reduce the impact given by the surface profile of the steel sheet S to the electrode performance. In addition, the surface roughness of the surface nickel-plating layer 32 is greater than that of the base nickel-plating layer 31. In this manner, the surface area of the plating layer 30 is increased, so that it is possible to improve properties such as heat-dissipation performance of the electrode.

The electricity storage device 1 may include: the resin spacer 4 disposed along the peripheral portion 11c of the bipolar electrode 3 and in contact with the plating layer 30; the plating layer 30 may have the protrusions 34 protruding in a direction intersecting with the direction in which the surface S1 of the steel sheet S extends; at least some of the protrusions 34 may be shaped so as to become thicker from the base ends 34a toward the tip ends 34b thereof; and a part 4a of the resin spacer 4 may be interposed between adjacent two of the protrusions 34 at least one of which has the shape becoming thicker, across a range from the tip ends 34b to the base ends 34a of the two adjacent protrusions 34. In such a case, it is possible to restrict the movement of the part 4a of the resin spacer 4 interposed between these two adjacent protrusions 34, in a direction away from the base ends 34a of the protrusions 34. Therefore, it is possible to reduce the chances of the resin spacer 4 peeling off from the plating layer 30.

The average height of the protrusions 34 may be equal to or greater than 15 μm and equal to or smaller than 30 μm. In such a case, it is possible to reduce the chances of the resin spacer 4 peeling off from the plating layer 30, favorably, while suppressing breakage of the protrusions 34.

At least one of the protrusions 34 has a plurality of built-up a plurality of nickel crystals. In such a case, irregularities are formed on the surface of the protrusion 34 where the nickel crystals built-up. Therefore, with the engagement of the part 4a of the resin spacer 4 with the recessed portions formed by the protrusion 34 on the surface, it is possible to reduce the chances of the resin spacer 4 peeling off from the plating layer 30, favorably.

It is also possible to form the base nickel-plating layer 31 having the convex portions 33 on the surface of the steel sheet S, by soaking the steel sheet S in the nickel bath in which the nickel concentration is set equal to or higher than 0.5 mol/L and equal to or lower than 2.0 mol/L, under a condition in which the current density is set equal to or higher than 0.5 A/dm$^2$ and equal to or lower than 5.0 A/dm$^2$. In such a case, it is possible to control the average height and the shapes of the convex portions 33 provided on the base nickel-plating layer 31, favorably. Therefore, the growth of the nickel from the convex portions 33 is promoted, and hence, the profile of the surface nickel-plating layer 32 is affected even less by the surface profile of the steel sheet S.

It is also possible to soak the steel sheet S in a nickel bath for a period equal to or more than 150 seconds and equal to or less than 2,400 seconds, under a condition in which a nickel bath temperature is set equal to or higher than 40° C. and equal to or lower than 65° C. In such a case, it is possible to control the average height and the shapes of the convex portions 33 even more favorably.

Figure 9:
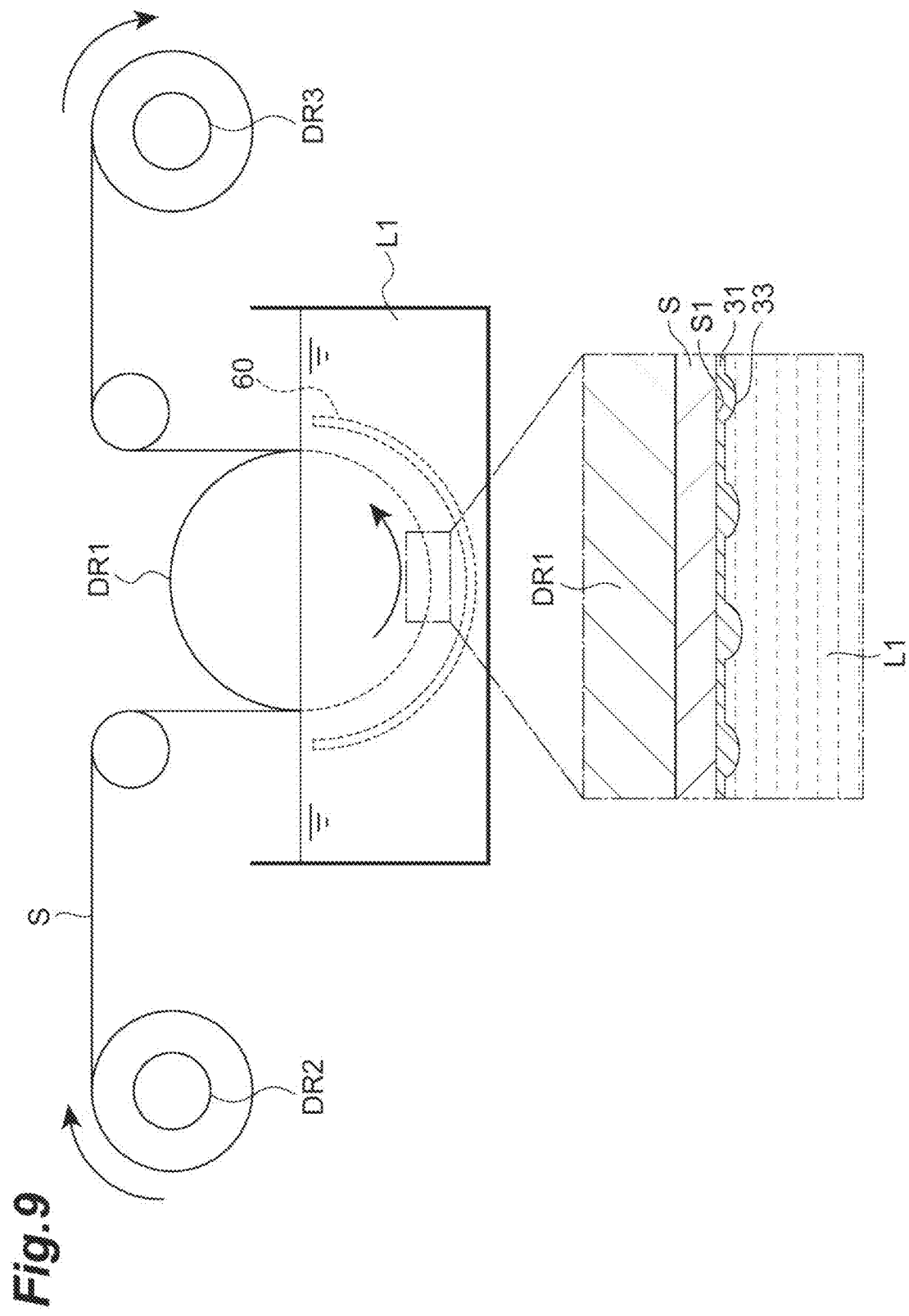
FIG. 9 is a schematic illustrating a step of forming the base nickel-plating layer on the surface of the steel sheet.

A specific example of the step of forming the base nickel-plating layer on the surface of the steel sheet will now be explained with reference to FIG. 9. FIG. 9 is a schematic illustrating the step of forming the base nickel-plating layer on the surface of the steel sheet. As illustrated in FIG. 9, the steel sheet S wound as a roll around a drum DR2 is pulled out, conveyed along the surface of at least the lower half of a drum DR1, and then wound around a drum DR3. At this time, the lower part of drum DR1 and an anode 60 are soaked in electrolyte L1 containing nickel cations. Therefore, the steel sheet S that is in contact with the lower surface of the drum DR1 becomes soaked in the electrolyte L1. Predetermined current is then applied between the drum DR1 and the anode 60, while the steel sheet S is being conveyed. In this manner, nickel is caused to precipitate on the surface S1 of the steel sheet S soaked in the electrolyte L1 (the surface of the steel sheet S on the opposite side of the surface that is in contact with the surface of the drum DR1), and the base nickel-plating layer 31 having the convex portions 33 is formed on the surface S1 of the steel sheet S.

It is possible to form the surface nickel-plating layer 32 having the protrusions 34, in the same manner as illustrated in FIG. 9, using the steel sheet S provided with the base nickel-plating layer 31 and wound around the drum DR3. Because, in the step of forming the surface nickel-plating layer 32, current concentrates on the convex portions 33, the nickel is caused to precipitate selectively in a manner having the base ends 34a at the convex portions 33, so that it is possible to form the protrusions 34 selectively. With such a method, too, it is possible to form a current collector 11 having the plating layer 30.

In the structure that is the same as that of the electricity storage device 1 described above, a relation between the current density set for the electrolytic plating and an average height of the protrusions will now be explained.

Figure 10:
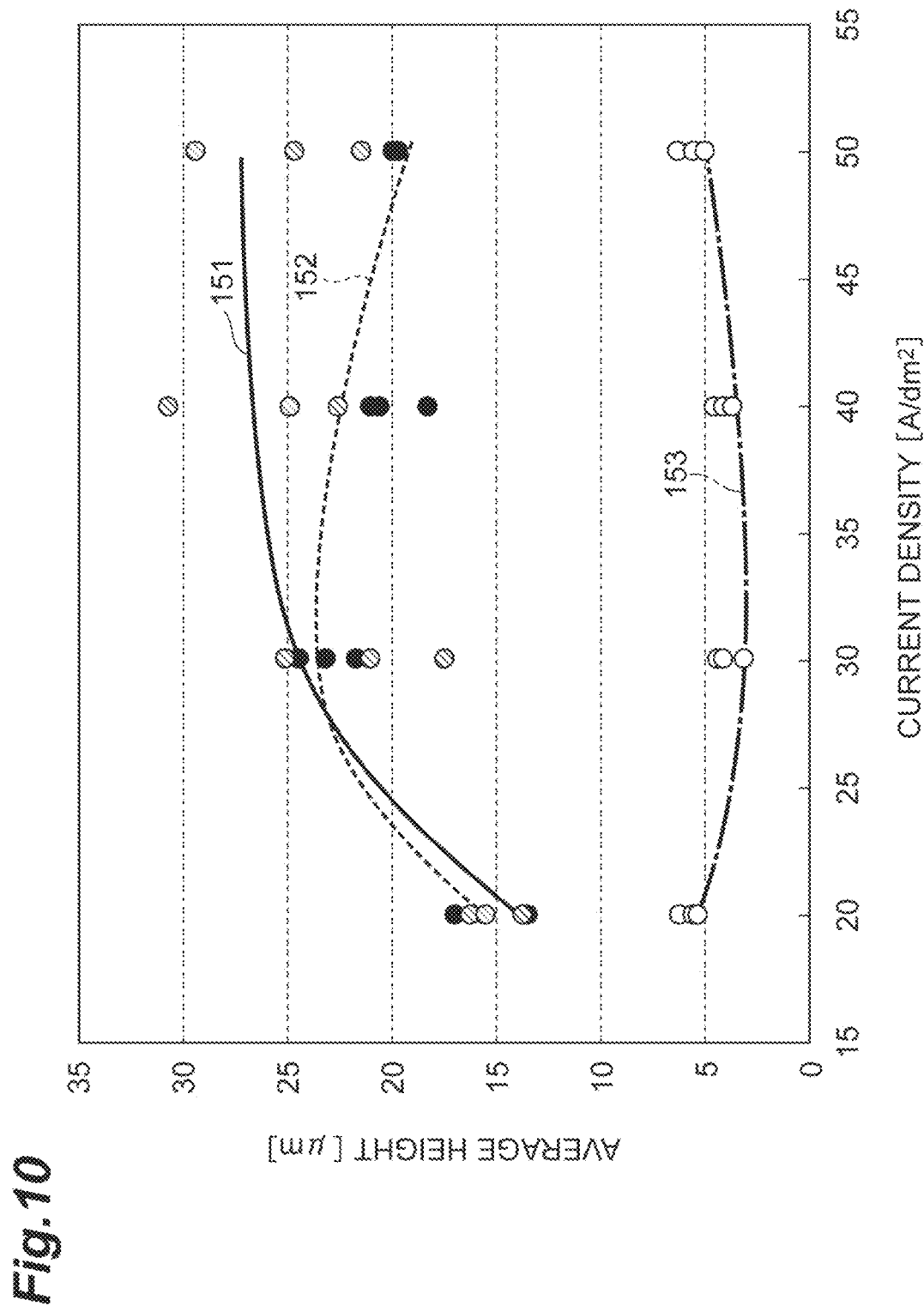
FIG. 10 is a graph illustrating a change in the average height of the protrusions with respect to a current density set for the electrolytic plating.

FIG. 10 is a graph illustrating a change in the average height of the protrusions with respect to a current density set for the electrolytic plating. In FIG. 10, the vertical axis represents the average height of the protrusions, and the horizontal axis represents a current density. The solid line 151 represents a change in the average height of the protrusions with respect to the current density when the nickel concentration of the Watts bath was set to 0.2 mol/L. The dotted line 152 represents a change in the average height of the protrusions with respect to the current density when the nickel concentration of the Watts bath was set to 0.15 mol/L. The long dashed short dashed line 153 represents a change in the average height of the protrusions with respect to the current density when the nickel concentration of the Watts bath was set to 0.3 mol/L. For example, when the current density was set equal to or higher than 25 A/dm$^2$, and the nickel concentration of the Watts bath was less than 0.3 mol/L, the average height of the protrusions was equal to or greater than 15 μm and equal to or smaller than 30 μm. When the current density was set equal to or higher than 20 A/dm$^2$, and the nickel concentration of the Watts bath was greater than 0.15 mol/L and less than 0.2 mol/L, the average height of the protrusions was also equal to or greater than 15 μm and equal to or smaller than 30 μm. The data indicated in FIG. 10 was obtained with the temperature of the Watts bath set to 30° C.

Figure 12:
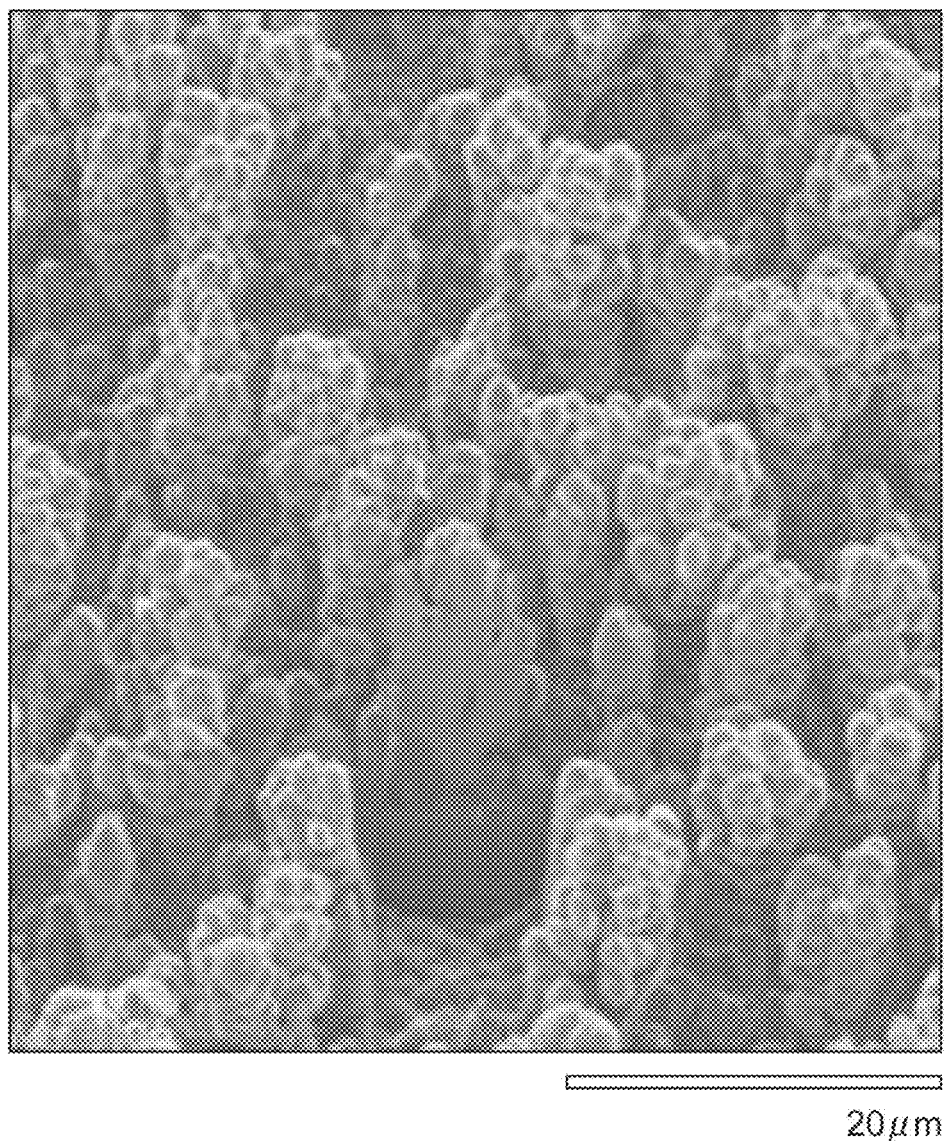
FIG. 12 is a photograph indicating a part of the surface of the surface nickel-plating layer.

The surface profiles of actually formed surface nickel-plating layers are indicated in FIGS. 11(a), 11(b), and 12. FIGS. 11(a), 11(b), and 12 are photographs each indicating a part of the surface of a surface nickel-plating layer. The surface nickel-plating layer indicated in FIG. 11(a) was formed by soaking the steel sheet having the base nickel-plating layer formed thereon in a Watts bath in which the temperature was set to 30° C. and the nickel concentration was set to 0.3 mol/L, for 40 seconds, under a condition in which the current density was set to 40 A/dm$^2$. The surface nickel-plating layer indicated in FIG. 11(b) was formed by soaking the steel sheet having the base nickel-plating layer formed thereon in a Watts bath in which the temperature was set to 30° C., and the nickel concentration was set to 0.2 mol/L, for 80 seconds, under a condition in which the current density is set to 20 A/dm$^2$. The surface nickel-plating layer indicated in FIG. 12 was formed by soaking the steel sheet having the base nickel-plating layer formed thereon in a Watts bath in which the temperature was set to 30° C., and the nickel concentration was set to 0.2 mol/L, for 40 seconds, under a condition in which the current density is set to 40 A/dm$^2$. The cavity at the center of FIGS. 11(a), 11(b), and 12 corresponds to a portion machined with a focused ion beam (FIB) apparatus.

The surface nickel-plating layer indicated in FIG. 11(a) includes a plurality of substantially spherical nickel crystals. The surface nickel-plating layer does not have the protrusions are shaped so as to become thicker. It is inferred that this is because the nickel concentration of the Watts bath was too high. Furthermore, the nickel crystals are aggregated in such a manner that the gaps are filled thereby. In such a case, because the gap formed between the adjacent nickel crystals is small, there is a tendency that the resin is less likely to get into the gap. Therefore, if a bipolar electrode is produced using a current collector having the surface nickel-plating layer indicated in FIG. 11(a), the sealability of the resin spacer in the peripheral portion tends to weaken. In addition, there is a chance that the surface area of the surface nickel-plating layer falls insufficient.

The plating layer indicated in FIG. 11(b) have protrusions that are provided irregularly. It can be said that some of these protrusions are shaped so as to become thicker from the base ends toward the tip ends thereof. It can be also said that nickel crystals overlap each other on some of the protrusions. However, most of the protrusions are shaped so as to become thinner. Furthermore, the average height of the protrusions is less than 15 μm. It is inferred that this is because the current density setting was too low. Therefore, if a bipolar electrode is produced using a current collector having the surface nickel-plating layer indicated in FIG. 11(b), the sealability of the resin spacer on the peripheral portion tends to be better than the example indicated in FIG. 11(a). There still remains a possibility that the surface area of the surface nickel-plating layer is insufficient.

The surface nickel-plating layer indicated in FIG. 12 has protrusions provided irregularly, in the same manner as that in the example illustrated in FIG. 11(b). Most of these protrusions are shaped so as to become thicker from the base ends toward the tip ends thereof. Furthermore, it can also be confirmed that the protrusions has a plurality of built-up a plurality of nickel crystals. In addition, the average height of the provided protrusions was equal to or greater than 15 μm and equal to or smaller than 30 μm. Therefore, when a bipolar electrode is produced using a current collector having the surface nickel-plating layer indicated in FIG. 12, there is a tendency for the sealability of the resin spacer on the peripheral portion to be particularly high, and a sufficient surface area of the surface nickel-plating layer is ensured, too.

All of the surface nickel-plating layers having the protrusions illustrated in FIGS. 11(a), 11(b), and 12 are clearly rougher than the base nickel-plating layer. Therefore, the surface roughness of the surface nickel-plating layer is clearly higher than that of the base nickel-plating layer, and the surface is clearly rougher than that of the base nickel-plating layer 31. The surface roughness of the surface nickel-plating layer 32 is clearly greater than that of the base nickel-plating layer 31, and the surface roughness Ra is equal to or greater than 1.5 μm and equal to or smaller than 6.0 μm, for example.

When the surface nickel-plating layer 32 is formed by leaving the steel sheet S with the base nickel-plating layer 31 formed in a Watts bath, it is preferable for the Watts bath to be stirred using a stir bar. In this manner, because the nickel cations are supplied to the surface of the base nickel-plating layer 31 favorably, there is a tendency that the profile of the surface nickel-plating layer 32 (e.g., the crude density of the surface nickel-plating layer 32) can be controlled, favorably. The stir bar may have a rod-like shape, a plate-like shape, or a propeller-like shape. The rotational frequency of the stir bar is, for example, equal to or higher than 0 min$^{-1}$ and equal to or less than 600 min$^{-1}$. By setting the rotational frequency of the stir bar equal to or higher than 0 min$^{-1}$ and equal to or lower than 600 min$^{-1}$, it is possible to control the number of the protrusions 34 per unit area of the surface nickel-plating layer 32, favorably. The rotational frequency of the stir bar may be equal to or higher than 200 min$^{-1}$ and equal to or lower than 600 min$^{-1}$. The lower boundary of the rotational frequency of the stir bar may be set higher than 0 min$^{-1}$.

Figure 14:
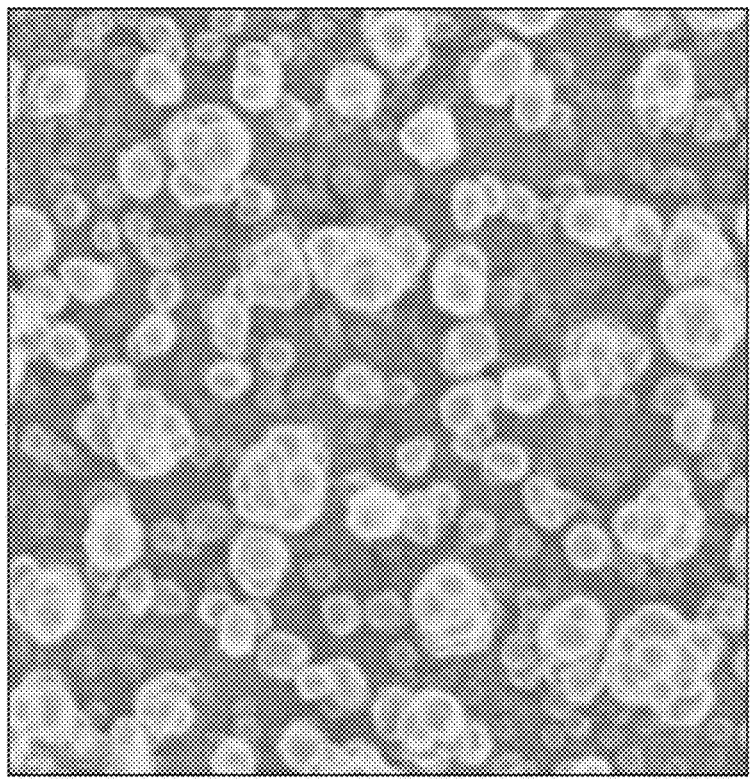
FIG. 14 is a photograph indicating a part of the surface of the surface nickel-plating layer after the electrolytic plating when the rotational frequency of the stir bar was set to 200 $\text{min}^{-1}$.

A change in the number of protrusions with respect to a rotational frequency of the stir bar will now be explained with reference to FIGS. 13(*a*), 13(*b*), and 14. FIG. 13(*a*) is a photograph indicating a part of the surface of a surface nickel-plating layer achieved when the rotational frequency of the stir bar was set to 0 min$^{-1}$. FIG. 13(*b*) is a photograph indicating a part of the surface of a surface nickel-plating layer achieved when the rotational frequency of the stir bar was set to 800 min$^{-1}$. FIG. 14 is a photograph indicating a part of the surface of the surface nickel-plating layer after the electrolytic plating when the rotational frequency of the stir bar was set to 200 min$^{-1}$.

When the rotational frequency of the stir bar was too low, the number of protrusions included in the surface nickel-plating layer became smaller, as illustrated in FIG. 13(*a*). In other words, the number of protrusions per unit area may be too small. It is inferred that this is because the nickel cations supplied to the surface of the base nickel-plating layer was insufficient. In such a case, the surface area of the plating layer may become insufficient. Furthermore, when the rotational frequency of the stir bar was too high, the protrusions included in the surface nickel-plating layer were formed too many, as illustrated in FIG. 13(*b*). In other words, too many protrusions were formed per unit area. It is inferred that this is because the nickel cations supplied to the surface of the base nickel-plating layer were excessive. At this time, because a smaller amount of resin gets inside of the space between two adjacent protrusions, there is a tendency for the sealability achieved with the resin spacer to become short. Addressing this issue, by setting the rotational frequency of the stir bar appropriately, it is possible to control the number of protrusions per unit area favorably, as illustrated in FIG. 14.

When the rotational frequency of the stir bar is equal to or higher than 0 min$^{-1}$ and equal to or less than 600 min$^{-1}$, the relative speed of the base nickel-plating layer 31 with respect to the Watts bath is, for example, equal to or higher than 0 m/s and equal to or lower than 1.0 m/s. This relative speed is a difference between the speed of the tip end of the stir bar, and the base nickel-plating layer 31 that is sitting still, and is calculated by multiplying the rotational speed to a circumferential length obtained from the trajectory of the tip end of the rotating stir bar, for example (that is, circumferential length×rotational speed). The direction in which the stir bar is rotated is not limited to a particular direction, and the rotational speed of the stir bar may be inconsistent. The stir bar may also be rotated intermittently.

Even when the stir bar is not used, it is possible to let the Watts bath flow. It is also possible to move the steel sheet S provided with the base nickel-plating layer 31 in the Watts bath. In any of these examples, because nickel cations are supplied favorably onto the base nickel-plating layer 31, there is a tendency that it is possible to control the profile of the surface nickel-plating layer 32, favorably. When at least the Watts bath is being caused to flow, or the steel sheet S is being moved, the moving speed of the steel sheet S with respect to the Watts bath is equal to or lower than 1.0 m/s, for example. The movement of the steel sheet S is achieved by causing a conveying machine or the like to convey the steel sheet S, for example.

The bipolar electrode 3 can be formed by providing active material layers, as appropriate, to the current collector 11 that has the plating layer 30 formed by the forming method described above. By then stacking a plurality of the bipolar electrodes 3 and the separators 7 as appropriate, it is possible to form the stack 2. The electricity storage device 1 illustrated in FIG. 1 can then be produced using the stack 2. As a method for producing the electricity storage device 1 using the bipolar electrode 3, a publicly known method may be used, as appropriate.

As described above, in the electricity storage device 1 produced with the producing method according to one embodiment, the plating layer 30 includes the surface nickel-plating layer 32 having the protrusions 34 protruding in the second direction D2. Therefore, the surface area of the surface nickel-plating layer 32 provided on the surface S1 is increased, compared with that of the plating layer simply following the surface profile of the steel sheet S. In addition, at least some of the protrusions 34 are shaped so as to become thicker from the base ends 34*a* toward the tip ends 34*b* thereof. The area of the tip end of the protrusion 34 is shaped so as to become thicker is larger than that of the tip end of an ordinary protrusion is shaped so as to become thinner. Consequently, it is possible to provide the electricity storage device 1 with a bipolar electrode 3 including the steel sheet S and a sufficient surface area.

The electricity storage device 1 includes the resin spacer 4 disposed along the peripheral portion 11*c* of the bipolar electrode 3, and that is in contact with the plating layer 30, and a part 4*a* of the resin spacer 4 may be interposed between adjacent two of the protrusions 34 at least one of which has the shape becoming thicker, across a range from the tip end 34*b* to the base end 34*a* thereof. In such a case, the movement of the part 4*a* of the resin spacer 4 interposed between the adjacent protrusions 34, in a direction away from the base end 34*a* is restricted. Therefore, it is possible to reduce the chances of the resin spacer 4 peeling off from the plating layer 30.

The average height of the protrusions 34 may be equal to or greater than 15 μm and equal to or smaller than 30 μm. In such a case, it is possible to ensure a sufficient surface area of the plating layer 30, while suppressing breakage of the protrusions 34.

At least one of the protrusions 34 may have a plurality of built-up a plurality of nickel crystals. In such a case, irregularities are formed on the surface of the protrusion 34 where the nickel crystals overlap, so that the surface areas of the protrusions 34 are further increased.

In a plan view, the number of protrusions 34 per unit area of the surface nickel-plating layer 32 may be equal to or greater than 2,500 and equal to or less than 7,000. In such a case, it is possible to ensure a sufficient surface area of the plating layer 30, while suppressing the chances of the adjacent protrusions 34 being brought into contact with each other.

The surface nickel-plating layer 32 may be formed on the base nickel-plating layer 31 by soaking the steel sheet S provided with the base nickel-plating layer 31 in a Watts bath in which the nickel concentration is set equal to or higher than 0.15 mol/L and lower than 0.30 mol/L, under a condition in which the current density is set equal to or higher than 30 A/dm² and equal to or lower than 50 A/dm². In such a case, because formation of the protrusions 34 are shaped so as to become thicker is promoted, the surface area of the surface nickel-plating layer 32 can be increased even more.

The surface nickel-plating layer 32 may be formed on the base nickel-plating layer 31 by soaking the steel sheet S provided with the base nickel-plating layer 31 in a Watts bath in which a temperature is set equal to or higher than 30° C. and equal to or lower than 60° C., for a period equal to or more than 30 seconds and equal to or less than 60 seconds. In such a case, because formation of the protrusions 34 are shaped so as to become thicker is promoted even more, the surface area of the surface nickel-plating layer 32 can be increased even further.

In the step of forming the surface nickel-plating layer 32, the relative speed of the surface S1 of the steel sheet S with respect to the Watts bath may be equal to or higher than 0 m/s and equal to or lower than 1.0 m/s. In such a case, it is possible to control the number of protrusions 34 per unit area, favorably.

In the step of forming the surface nickel-plating layer 32, at least one of the protrusions 34 may have a plurality of built-up a plurality of nickel crystals. In such a case, because irregularities are formed on the surface of the protrusion 34 where the nickel crystals overlap, the surface areas of the protrusion 34 are increased.

Figure 15:
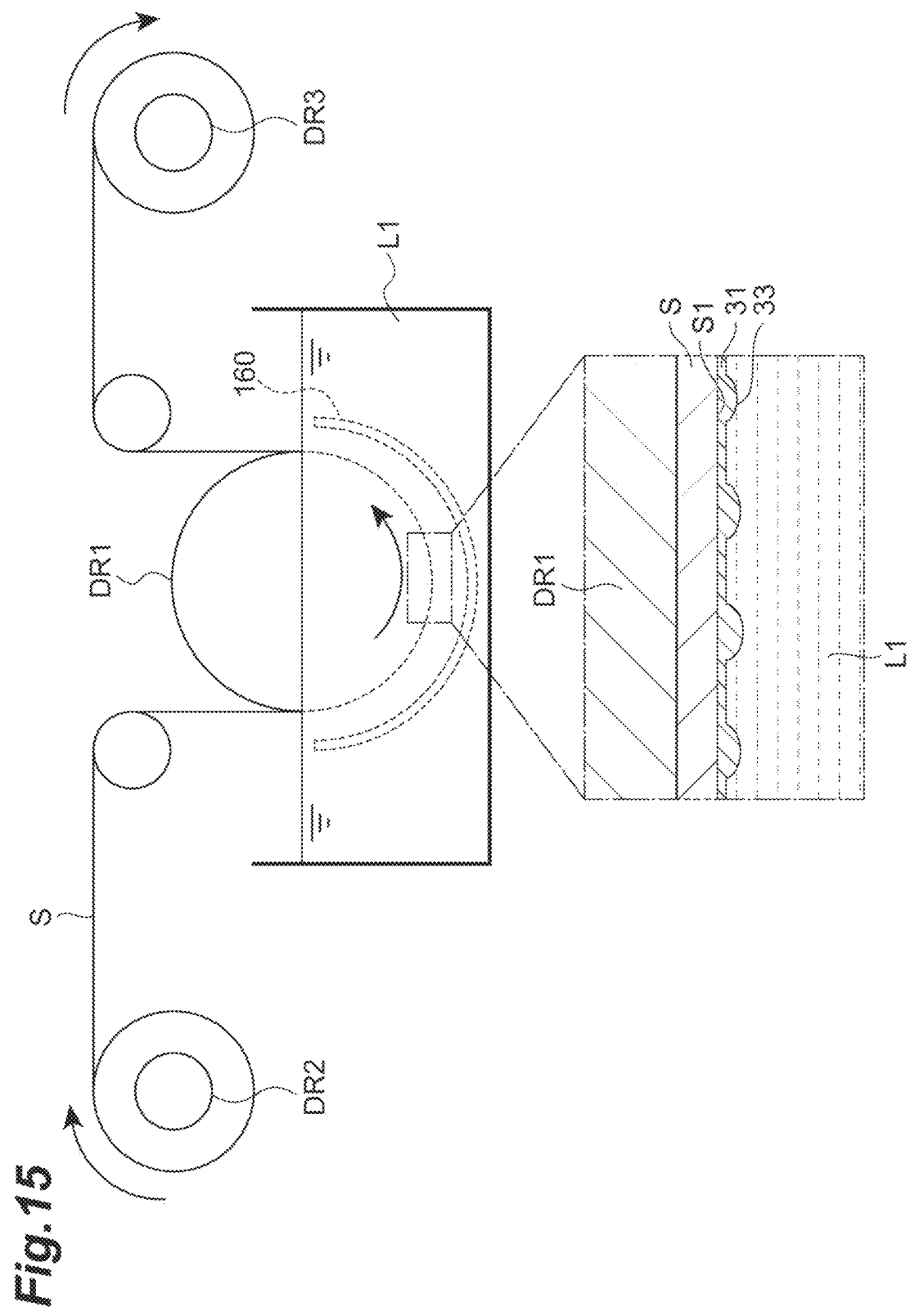
FIG. 15 is a schematic illustrating a step of forming the base nickel-plating layer on the surface of the steel sheet.
Figure 16:
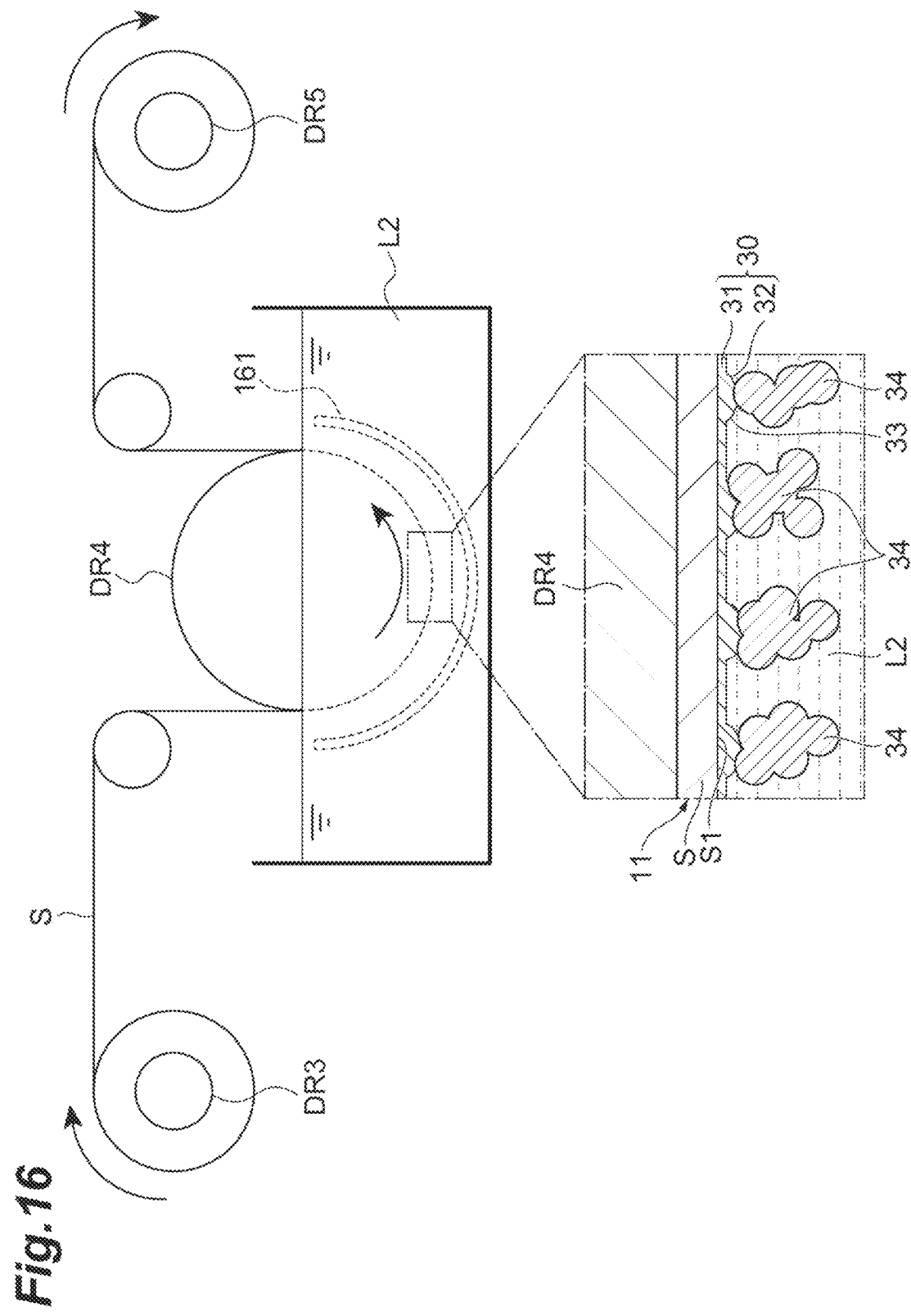
FIG. 16 is a schematic illustrating a step of forming the surface nickel-plating layer on the base nickel-plating layer.

A specific example of the step of forming the plating layer on surface of the steel sheet will now be explained with reference to FIGS. 15 and 16. FIG. 15 is a schematic illustrating a step of forming the base nickel-plating layer on the surface of the steel sheet. FIG. 16 is a schematic illustrating a step of forming the surface nickel-plating layer on the base nickel-plating layer.

As illustrated in FIG. 15, the steel sheet S wound as a roll around the drum DR2 is pulled out, conveyed along the surface of at least the lower half of the drum DR1, and then wound around the drum DR3. At this time, the lower part of drum DR1 and an anode 160 are soaked in the electrolyte L1 containing nickel cations. Therefore, the steel sheet S that is in contact with the lower surface of the drum DR1 becomes soaked in the electrolyte L1. Predetermined current is then applied between the drum DR1 and the anode 160 while the steel sheet S is being conveyed. In this manner, nickel is caused to precipitate on the surface S1 of the steel sheet S soaked in the electrolyte L1 (the surface of the steel sheet S on the opposite side of the surface that is in contact with the surface of the drum DR1), and the base nickel-plating layer 31 having the convex portions 33 is formed on the surface S1 of the steel sheet S.

The steel sheet S wound as a roll around the drum DR3 is then pulled out, conveyed along the surface of at least the lower half of the drum DR4, and then wound around the drum DR5, as illustrated in FIG. 16. At this time, the lower part of the drum DR4 and an anode 161 are soaked in a Watts bath L2. Therefore, the steel sheet S that is in contact with the lower surface of the drum DR4 becomes soaked in the Watts bath L2. Predetermined current is then applied between the drum DR4 and the anode 161, while the steel sheet S is being conveyed. In this manner, nickel is caused to precipitate on the base nickel-plating layer 31 formed on the steel sheet S that is soaked in the Watts bath L2, and the surface nickel-plating layer 32 including the protrusions 34 is formed. It is assumed that the speed at which the steel sheet S is conveyed is equal to or lower than 1.0 m/s, for example, and the Watts bath is not flowing, for reasons other than the rotations of the drum DR4 and the conveyance of the steel sheet S.

An electrolytic plating method that is used in at least one of the step of forming the surface nickel-plating layer and the step of forming the surface nickel-plating layer explained above in the one embodiment will now be explained.

Figure 17:
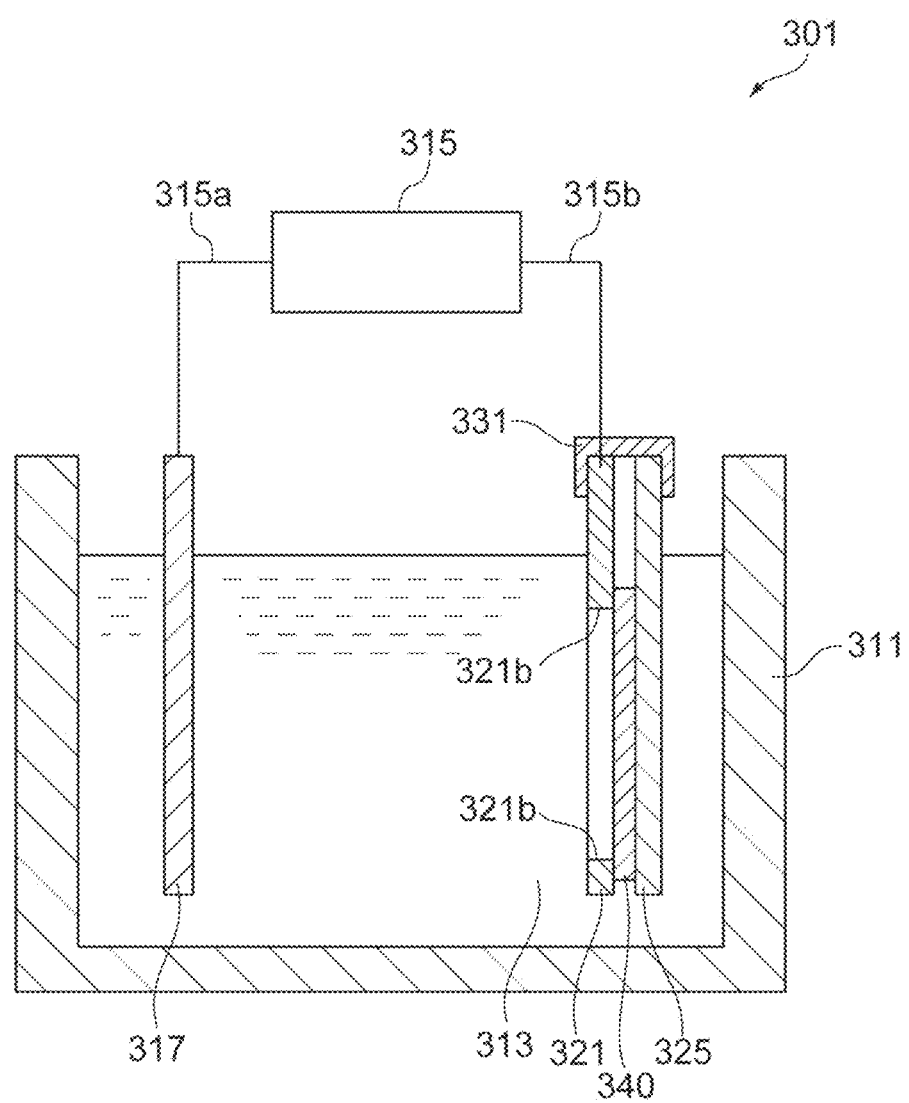
FIG. 17 is a cross-sectional view schematically illustrating a plating method according to one embodiment.

A plating apparatus 301 according to a first mode will now be explained. As illustrated in FIG. 17, the plating apparatus 301 includes a plating tank 311, a metallic member 317 serving as an anode, a metallic member (base material) 340 serving as a cathode, a first clamping member 321 and a second clamping member 325 for clamping the metallic member 340 therebetween, a holding member 331 that holds the first clamping member 321 and the second clamping member 325 integrally, a direct current power supply 315, and lead lines 315a, 315b.

The plating tank 311 stores therein plating solution 313. An example of the plating solution 313 includes electrolyte containing nickel cations, such as aqueous solution of nickel chloride and nickel sulfate solution. The concentration (mol/L) and the temperature (° C.) of the plating solution are set as appropriate, based on factors such as the metal to be plated, and the plating thickness.

The metallic member 317 forming an anode is nickel, for example. The metallic member 317 is connected to the direct current power supply 315 via a lead line 15a. The metallic member 340 forming a cathode is, for example, a cold-rolled steel sheet (such as an SPCC), as stipulated in JIS G 3141:2005. The thickness of the metallic member 340 may be set equal to or greater than 0.1 μm and equal to or smaller than 1000 μm, for example.

Figure 18:
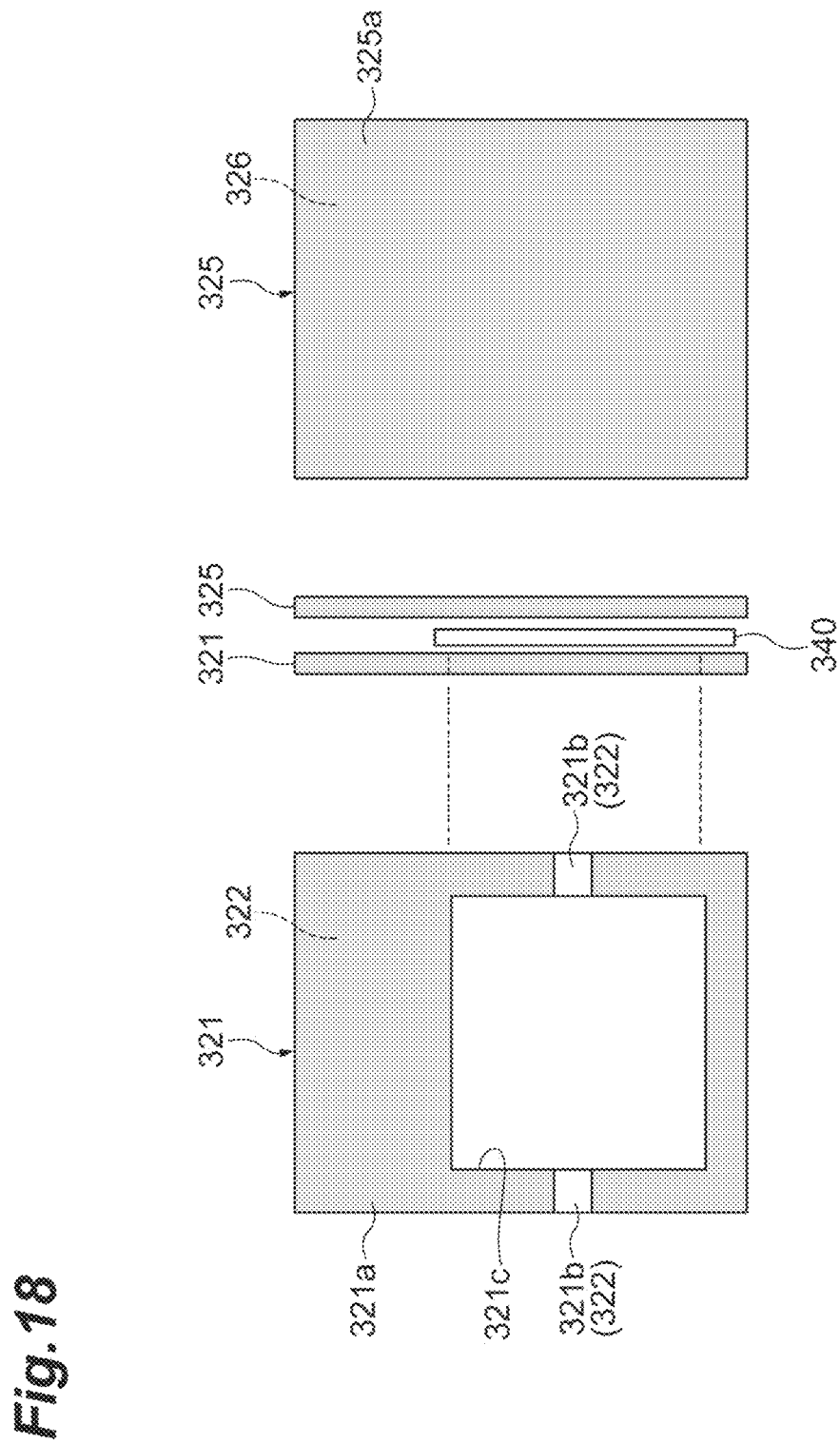
FIG. 18 is a side view of the first clamping member and the second clamping member illustrated in FIG. 17, and a front view of the first clamping member and the second clamping member illustrated in FIG. 17, viewed from a metallic material.

As illustrated in FIGS. 17 and 18, the first clamping member 321 includes a conductive member 322, and the entire surface of the conductive member 322 is masked (covered) by an insulator 321a. An example of the material of the conductive member 322 is stainless steel (SUS304), and an example of the material of the insulator (insulation coating) 321a for masking the entire surface of the conductive member 322 is polyester. The first clamping member 321 has an opening 321c in the central part in a front view. The first clamping member 321 has two exposed portions 321b, 321b, with the opening 321c positioned therebetween. The exposed portions 321b, 321b are where the insulator 321a is peeled off and the conductive member 322 is exposed. Explained in the first mode is an example provided with two exposed portions 321b, 321b, but the number of exposed portions 321b may be one, or three or more.

The second clamping member 325 includes a conductive member 326, and the entire surface of the conductive member 326 is masked with an insulator 325a. An example of the material of the conductive member 326 is stainless steel (SUS304), and an example of the material of the insulator 325a for masking the entire surface of the conductive member 326 is polyester, in the same manner as the second clamping member 325. Unlike the first clamping member 321, the second clamping member 325 is not provided with the opening 321c, in the central part in a front view. Furthermore, unlike the first clamping member 321, the second clamping member 325 is not provided with the exposed portion where the insulator 325a is peeled off and the conductive member 326 is exposed. The holding member 331 holds the first clamping member 321 and the second clamping member 325 integrally.

In the first mode, the opening 321c provided on the first clamping member 321 is placed at a position corresponding to the area to be plated on the metallic member 340. Furthermore, the exposed portions 321b, 321b provided on the first clamping member 321 are placed at positions corresponding to the parts to which the current is to be supplied in the metallic member 340. The metallic member 340 is then clamped with the first clamping member 321 and the second clamping member 325 in such a manner that this positional relation is maintained. The metallic member 340 clamped in this manner is then soaked as a cathode in the plating solution stored in the plating tank 311, and current is supplied (voltage is applied) to the first clamping member 321 provided with the exposed portions 321b, 321b.

Figure 19:
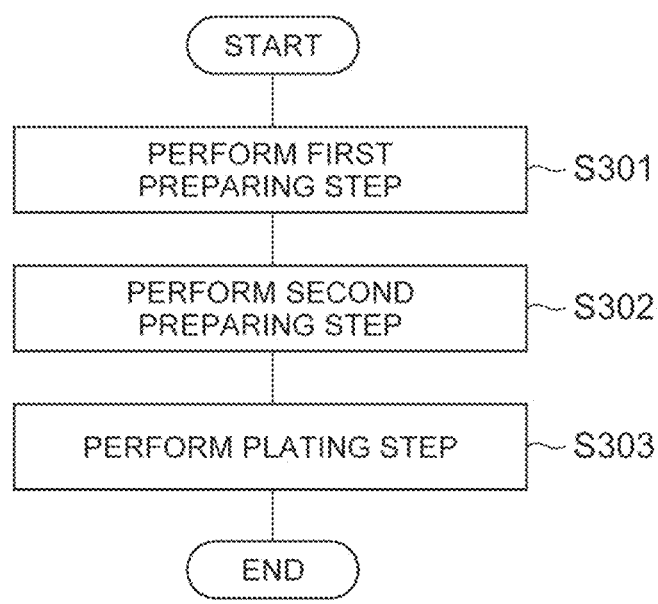
FIG. 19 is a flowchart of the electrolytic plating method according to the one embodiment.

An electrolytic plating method using the plating apparatus 301 described above will now be explained in detail. The electrolytic plating method according to the first mode includes, as illustrated in FIG. 19, a first preparing step S301, a second preparing step S302, and a plating step S303.

In the first preparing step S301, the entire surface of the conductive member 322 is masked with the insulator 321a, and the first clamping member 321 provided with the opening 321c, and the second clamping member 325 with the entire surface of the conductive member 326 masked with the insulator 325a, as illustrated in FIG. 18, are prepared.

In the second preparing step S302, the exposed portions 321b where the conductive member 322 is exposed are then formed by peeling off the insulator 25a from a part of the first clamping member 321. In the second preparing step S302, the exposed portions 321b, 321b are formed on the first clamping member 321.

In the plating step S303, the first clamping member 321 is disposed in such a manner that the opening 321c is placed at a position corresponding to the area to be plated in the metallic member 340. The first clamping member 321 is then disposed in such a manner that the exposed portions 321b, 321b are placed at positions corresponding to the parts to which the current is to be supplied, in the metallic member 340. The metallic member 340 is then clamped between such first clamping member 321 and second clamping member 325. The metallic member 340 clamped with the first clamping member 321 and the second clamping member 325 is soaked, as a cathode, in the plating solution 313 stored in the plating tank 311, and current is supplied to the conductive member 322 of the first clamping member 321 provided with the exposed portions 321b, 321b. In this manner, the current is supplied to the metallic member 340 via the exposed portions 321b, 321b.

Actions and effects achieved by the electrolytic plating method according to the first mode will now be explained.

With the electrolytic plating method described above, by performing a simple task of peeling off a part of the insulation coating from the first clamping member 321, before clamping the metallic member 340 with the first clamping member 321 and the second clamping member 325, it is possible to form a portion via which the current is to be fed to the metallic member 340. In the first clamping member 321 provided with the exposed portions 321b, 321b, it is possible to conduct current to the metallic member 340 that is brought into contact with the first clamping member 321, via the exposed portions 321b, 321b. Therefore, when the metallic member 340 is clamped with the first clamping member 321 and the second clamping member 325, by disposing the first clamping member 321 in such a manner that the exposed portions 321b, 321b are placed at positions corresponding to the parts to which the current is to be supplied in the metallic member 340, the metallic member 340 can receive supply of the current via the exposed portions 321b, 321b. As mentioned earlier, because only required to form a portion via which the current is supplied is peeling off the insulator 321a from the first clamping member 321, this portion via which the current is to be fed can be changed in any way. As a result, it becomes possible to change the portion via which the current is supplied, easily, in the metallic member 340 used as a cathode in the electrolytic plating.

In the second preparing step S302 of the electrolytic plating method, because the exposed portions 321b, 321b are formed on the first clamping member 321, it is possible to feed current to the metallic member 340 from an area around the area to be plated. Furthermore, because the exposed portions 321b, 321b are disposed in the plating solution during the plating, it is possible to supply current to the metallic member 340 in the plating solution.

In the second preparing step S302 of the electrolytic plating method, because the exposed portions 321b, 321b are formed on the first clamping member 321, it is possible to distribute the portions via which the current is to be fed across the metallic member 340, so that the metallic member 340 can be plated more evenly.

A plating method according to a second mode will now be explained. Because the plating apparatus 301 is the same as that used in the plating method according to the first mode, detailed explanations thereof will be omitted.

Figure 20:
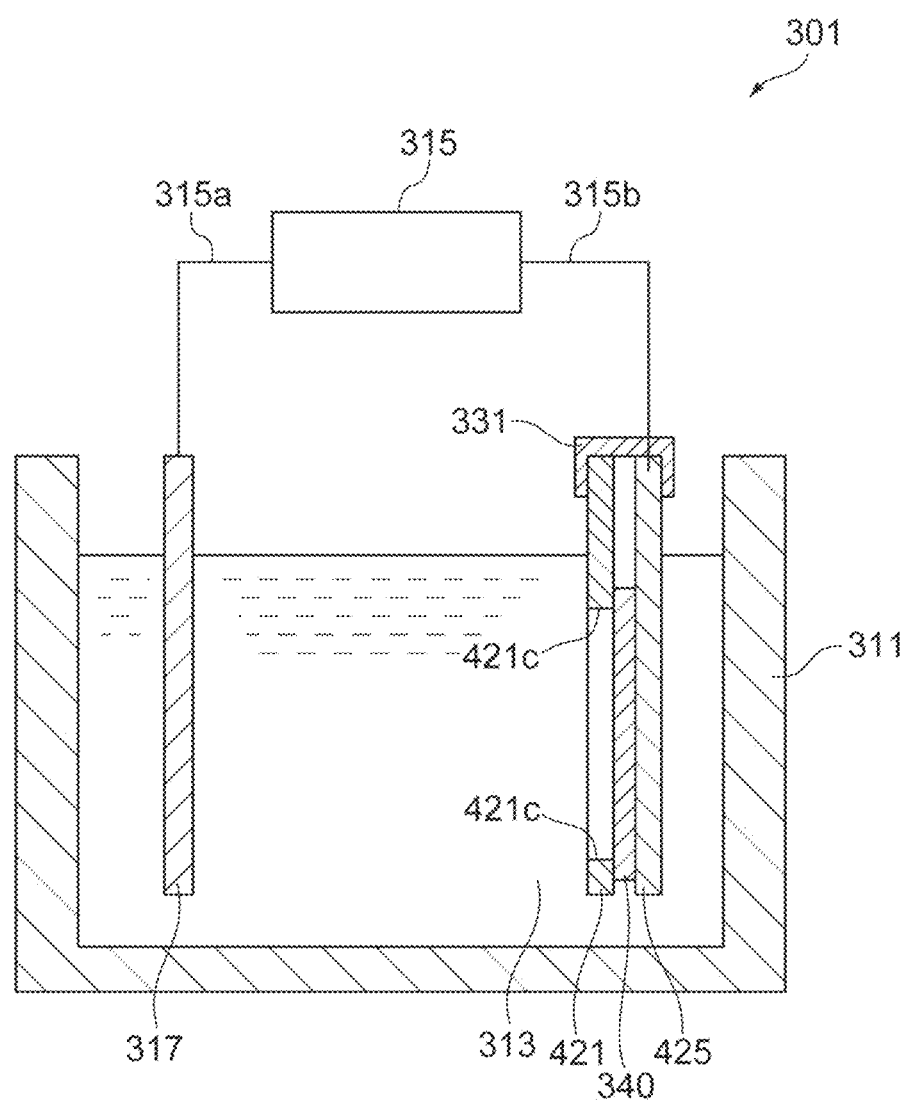
FIG. 20 is a cross-sectional view schematically illustrating a plating method according to another embodiment.
Figure 21:
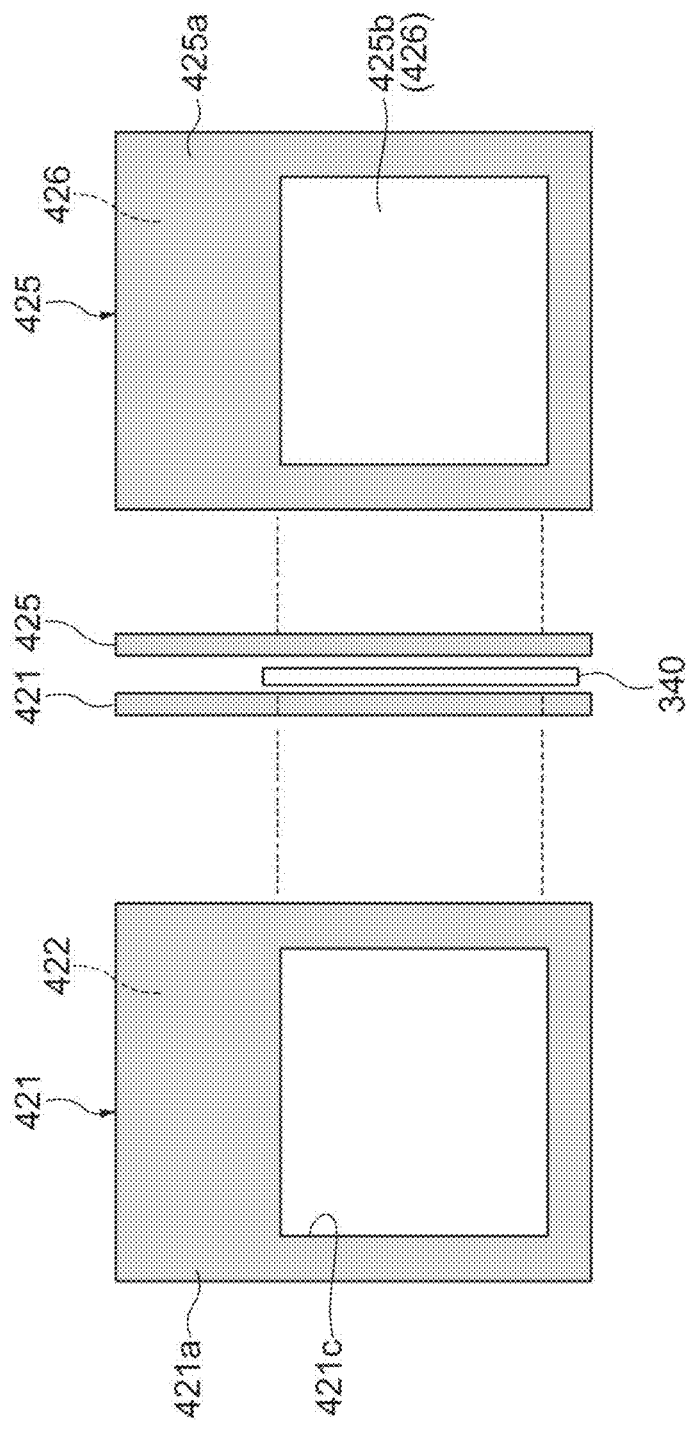
FIG. 21 is a side view of the first clamping member and the second clamping member illustrated in FIG. 20, and is a front view of the first clamping member and the second clamping member illustrated in FIG. 20, viewed from the metallic material.

As illustrated in FIGS. 20 and 21, a first clamping member 421 includes a conductive member 422, and the entire surface of the conductive member 422 is masked with an insulator 421a. An example of the material of the conductive member 422 is stainless steel (SUS304), and an example of the material of the insulator 421a for masking the entire surface of the conductive member 422 is polyester. The first clamping member 421 has an opening 421c in the central part in a front view. The first clamping member 421 is not provided with the exposed portion 321b, unlike the first clamping member 321 according to the first mode.

The second clamping member 425 includes a conductive member 426, and the entire surface of the conductive member 426 is masked with an insulator 425a. An example of the material of the conductive member 426 is stainless steel (SUS304), and an example of the material of the insulator 425a for masking the entire surface of the conductive member 426 is polyester, in the same manner as the second clamping member 425. The second clamping member 425 has an exposed portion 425b at a position overlapping with the opening 421c of the first clamping member 421, in a plan view. The exposed portion 425b is a part where the insulator 425a is peeled off and the conductive member 426 is exposed. The holding member 331 holds the first clamping member 421 and the second clamping member 425 integrally.

In the second mode, the opening 421c provided on the first clamping member 421 is placed at a position corresponding to the area to be plated on the metallic member 340. Furthermore, the exposed portion 425b provided on the second clamping member 425 is placed at a position corresponding to the part of the metallic member 340 to which the current is to be supplied. In other words, the exposed portion 425b is placed to be brought into contact with the rear surface of the area to be plated on the metallic member 340. The metallic member 340 is then clamped with the first clamping member 421 and the second clamping member 425 placed in the manner described above. The metallic member 340 clamped in this manner is then soaked, as a cathode, in the plating solution stored in the plating tank 311, and current is supplied (voltage is applied) to the second clamping member 425 provided with the exposed portion 425b.

The electrolytic plating method using the plating apparatus 301 described above will now be explained in detail. The electrolytic plating method according to the second mode includes the first preparing step S301, the second preparing step S302, and the plating step S303 as illustrated in FIG. 19, in the same manner as in the first mode.

In the first preparing step S301, as illustrated in FIG. 21, the entire surface of the conductive member 422 is masked with the insulator 421a, and the first clamping member 421 having the opening 421c, and the second clamping member 425 with the entire surface of the conductive member 426 masked with the insulator 425a, and provided with the exposed portion 425b are prepared. At the second preparing step S302, the exposed portion 425b where the conductive member 426 is exposed is then formed by peeling off the insulator 425a from a part of the second clamping member 425.

In the plating step S303, the first clamping member 421 is disposed in such a manner that the opening 421c is placed at a position corresponding to the area to be plated on the metallic member 340. The second clamping member 425 is then disposed in such a manner that the exposed portion 425b is placed at a position corresponding to the part to which the current is to be supplied, in the metallic member 340. The metallic member 340 is then clamped with the first clamping member 421 and the second clamping member 425. The metallic member 340 clamped with the first clamping member 421 and the second clamping member 425 is soaked, as a cathode, in the plating solution 313 stored in the plating tank 311. The current is then supplied to the conductive member 426 included in the second clamping member 425 having the exposed portion 425b, and the current is supplied to the metallic member 340 via the exposed portion 425b.

The electrolytic plating method according to the second mode, too, can achieve the same effects achieved by the method according to the first mode. Furthermore, in the second mode, the current is supplied from the rear surface, in a manner corresponding to the area to be plated on the metallic member 340. In this manner, it is possible to supply current to the area to be plated evenly, and to achieve a uniform plating thickness.

The one aspect of the present invention is not limited to the first mode and the second mode described above. Explained in the first mode is an example in which the exposed portions 321b, 321b are provided in such a manner that the area to be plated is interposed therebetween, but the one aspect of the present invention is not limited thereto. For example, the exposed portion may be provided on the first clamping member 321 in a manner surrounding the area to be plated. In the first mode, because the exposed portion can be formed by performing a simple task of peeling off the part masked with the insulator 321a, it is possible to form any exposed portion having any shape and any size, easily.

Explained in the first mode and the second mode is an example of nickel plating, but the first mode and the second mode can also be applied to copper plating, chrome plating, or tin plating, for example.

The one aspect of the present invention is not limited to the embodiments described above, and various other modifications are still possible. For example, in the embodiment described above, the base nickel-plating layer is not a smooth plating layer, but the one aspect of the present invention is not limited thereto.

Explained in the embodiment described above is an example in which, as illustrated in FIG. 2(a), the peripheral portion 11c of the current collector 11 has the plating layer 30 covering the one surface S1 of the steel sheet S, and the resin spacer 4 is disposed on the peripheral portion 11c via the plating layer 30, but the one aspect of the present invention is not limited thereto. For example, as illustrated in FIG. 22(a), the resin spacer 4 may be disposed across both surfaces 11a, 11b of the current collector 11. In other words, it is possible to implement an electricity storage device 1A having a structure in which the one surface S1 of the steel sheet S is bonded to the resin spacer 4 via the plating layer 30, and the other surface S2 of the steel sheet S is covered by the resin spacer 4, in the peripheral portion 11c of the current collector 11.

Furthermore, as illustrated in FIG. 22(a), when the resin spacer 4 is disposed across both surfaces 11a, 11b of the current collector 11, it is possible to suppress distortion or warpage of the current collector 11, the positive electrode layer 12, or the negative electrode layer 13, the distortion or the warpage being resultant of a difference in the degree of expansion or shrinkage the resin spacer 4 and the current collector 11 go through, due to a temperature change (resultant of heating and cooling exposed during the production process of the electricity storage device 1A, an exothermic reaction with the bipolar electrodes 3, or a change in the outdoor temperature), absorption of humidity, or deterioration over time.

In the embodiment described above, the plating layer 30 is provided on the one surface S1 of the steel sheet S, as illustrated in FIG. 2(a), but the plating layer 30 may be provided on both of the one surface S1 and the other surface S2. Furthermore, in such a case as well, the resin spacer 4 may be disposed across both surfaces 11a, 11b of the current collector 11, as illustrated in FIG. 22(b). In other words, it is possible to implement an electricity storage device 1B having a structure in which both of the surfaces S1, S2 of the steel sheet S are bonded to the resin spacer 4 via the corresponding plating layers 30, in the peripheral portion 11c of the current collector 11.

In the embodiment described above, as illustrated in FIG. 2(a), the plating layer 30 is provided on the one surface S1 of the steel sheet S, but the plating layer 30 may be provided only on another surface S2, without being provided on the one surface S1. Furthermore, in such a case as well, the resin spacers 4 may be disposed across both surfaces 11a, 11b of the current collector 11, as illustrated in FIG. 22(c). In other words, it is possible to implement an electricity storage device 1C having a structure in which the one surface S1 of the steel sheet S is covered by the resin spacer 4, and the other surface S2 is bonded to the resin spacer 4 via the plating layer 30, in the peripheral portion 11c of the current collector 11.

REFERENCE SIGNS LIST 1, 1A, 1B, 1C . . . electricity storage device, 2 . . . stack, 3 . . . bipolar electrode (electrode), 4 . . . resin spacer, 5 . . . casing, 6 . . . binding body, 7 . . . separator, 11 . . . current collector, 11a . . . one surface, 11b . . . the other surface, 11c . . . peripheral portion, 12 . . . positive electrode layer, 13 . . . negative electrode layer, 30 . . . plating layer, 31 . . . base nickel-plating layer, 32 . . . surface nickel-plating layer, 33 . . . convex portion, 34 . . . protrusion, 34a . . . base end, 34b . . . tip end, 34c . . . enlarged portion, S . . . steel sheet, S1, S2 . . . surface, 301 . . . plating apparatus, 321 . . . first clamping member, 321a . . . insulator, 321b . . . exposed portion, 321c . . . opening, 322, 326 . . . conductive member, 325 . . . second clamping member, 325a . . . insulator, 331 . . . holding member, 340 . . . metallic member (base material), 421 . . . first clamping member, 421a . . . insulator, 421c . . . opening, 422, 426 . . . conductive member, 425 . . . second clamping member, 425a . . . insulator, 425b . . . exposed portion, S301 . . . first preparing step, S302 . . . second preparing step, S303 . . . plating step

The invention claimed is:

1. An electricity storage device, comprising:
a stack of electrodes each including a steel sheet,
a plating layer provided on a surface of the steel sheet, and
a resin spacer disposed along a peripheral portion of each of the electrodes and in contact with the plating layer, wherein
the plating layer includes
a base nickel-plating layer provided on the surface of the steel sheet, and
a surface nickel-plating layer provided on the base nickel-plating layer and having a plurality of protrusions protruding in a direction intersecting with a direction in which the surface of the steel sheet extends;
at least some of the protrusions are each provided with an enlarged portion positioned nearer to a tip end of each of the protrusions rather than a base end of each of the protrusions;
the base nickel-plating layer entirely covers the surface of the steel sheet and is formed as a continuous film;
the base nickel-plating layer having a plurality of convex projections protruding in a direction of the surface nickel-plating layer, such that a surface profile of the base nickel-plating layer does not follow the surface of the steel sheet and is rougher than a surface profile of the surface of the steel sheet;
the enlarged portion is formed by building up a plurality of metal deposits;
the enlarged portion has a length size that is greater than a length size of the base end in the direction in which the surface of the sheet steel extends;
the electrodes are a plurality of bipolar electrodes each having a current collector formed from a nickel-plated steel sheet, a positive electrode layer provided on one side of the current collector, and a negative electrode layer provided on an other side of the current collector;
the stack is formed of the plurality of bipolar electrodes being stacked via separators; and
the number of protrusions per unit area of the surface nickel-plating layer in a plan view is equal to or greater than 2,500/mm$^2$ and equal to or less than 7,000/mm$^2$, wherein
the electricity storage device further comprises a casing holding a peripheral portion of the current collector via the resin spacer.

2. The electricity storage device according to claim 1, wherein a part of the resin spacer is interposed between two adjacent protrusions, at least one of which has the enlarged portion, across a range from the tip ends to the base ends thereof.

3. The electricity storage device according to claim 1, wherein an average height of the protrusions is equal to or greater than 15 μm and equal to or smaller than 30 μm.

4. The electricity storage device according to claim 1, wherein each of the metal deposits has a spherical shape.

5. The electricity storage device according to claim 1, wherein the electricity storage device is a nickel-hydrogen secondary battery.

6. The electricity storage device according to claim 1, wherein at least one of the plurality of protrusions has a plurality of built-up nickel crystals.

7. The electricity storage device according to claim 1, wherein
the plating layer is formed on a peripheral portion of the current collector and a resin spacer is bonded to the peripheral portion,
the electricity storage device comprises a tubular resin portion configured to hold the stack by encompassing sides thereof, and
the electricity storage device is a bipolar battery.

8. The electricity storage device according to claim 1, wherein
at least some of the protrusions are shaped so as to become thicker from base ends toward tip ends thereof.

9. The electricity storage device according to claim 7, wherein
a part of the resin spacer is interposed between two adjacent protrusions, at least one of which are shaped so as to become thicker, across a range from the tip ends to the base ends thereof.

10. The electricity storage device according to claim 2, wherein
at least some of the protrusions are shaped so as to become thicker from base ends toward tip ends thereof.

11. The electricity storage device according to claim 7, wherein
at least some of the protrusions are shaped so as to become thicker from base ends toward tip ends thereof.

12. The electricity storage device according to claim 2, wherein the resin spacer interposed between two adjacent protrusions has an undercut shape.

13. The electricity storage device according to claim 1, wherein the protrusions project from a base end being a portion in contact with the convex projections formed on the base nickel-plating layer.

14. The electricity storage device according to claim 1, wherein an area in which the negative electrode layer is formed on the other side of the current collector is larger than an area in which the positive electrode layer is formed on the one side of the current collector.

15. The electricity storage device according to claim 1, wherein the peripheral portion of each of the electrodes is provided with a non-coated area in which the positive electrode layer and the negative electrode layer are not formed, the non-coated area being provided with an exposed area in which the resin spacer is not disposed.

* * * * *